United States Patent [19]
Evans et al.

[11] Patent Number: 5,274,316
[45] Date of Patent: Dec. 28, 1993

[54] STEPPER MOTOR RAMP GENERATION

[75] Inventors: Stuart G. Evans; William G. Irwin, both of Rochester, N.Y.

[73] Assignee: Eastman Kodak Company, Rochester, N.Y.

[21] Appl. No.: 695,828

[22] Filed: May 6, 1991

[51] Int. Cl.$^5$ ............................................. H01P 8/00
[52] U.S. Cl. ................................... 318/696; 318/443
[58] Field of Search ............................ 318/696, 443

[56] References Cited

U.S. PATENT DOCUMENTS 4,591,774 5/1986 Ferris et al. ..................... 318/696
4,866,357 9/1989 Miller et al. ..................... 318/443

Primary Examiner—William M. Shoop, Jr.
Assistant Examiner—Karen Masih
Attorney, Agent, or Firm—Martin G. Linihan

[57] ABSTRACT

A method for generating stepper motor ramps and analyzing the motor torque required compared with the motor torque available wherein the generated ramp accelerates the motor as fast as possible while maintaining a user settable torque safety factor and/or safety margin. The method uses the minimum available stepper motor torque at the current motor speed to ultimately compute the maximum useable acceleration, uses the maximum acceleration to generate the next motor step time and hence the next motor velocity, computes the next velocity from the desired acceleration and the previous velocity and utilizes friction during deceleration of the motor. In particular, the method comprises determining the minimum available torque using the current motor velocity and the torque-speed characteristic of the motor, applying to the available torque a safety factor and then a safety margin to determine maximum useable torque wherein the safety factor is derived from motor information and the safety margin is derived from system information, calculating the maximum acceleration using the friction and moment of inertia of the system and the maximum usable motor torque, calculating the time duration of the next step for advancing the motor, repeating the foregoing steps to determine all steps in the ramps, and utilizing the generated motor ramps in advancing the stepper motor. The generated ramp always exploits the full drive capability of the stepper motor, and it provides a relatively constant margin between available torque and required torque during both acceleration and deceleration of the motor.

7 Claims, 6 Drawing Sheets

STEPPER MOTOR RAMP GENERATION

TECHNICAL FIELD

This invention relates to the art of controlling the step-wise operation of stepper motors, and more particularly to a new and improved method for generating stepper motor ramps which exploits the full drive capability of the stepper motor during each step of the ramp.

BACKGROUND OF THE INVENTION

Stepper motors are widely used in application requiring accurate position control and compatibility with digital systems. Electrical pulses of suitable amplitude and pulse width are supplied to the stepper motor to advance the motor by a predetermined distance for each pulse. One advantage of stepper motors is that the motor position can be determined by counting the pulses applied to it.

Stepper motors have a torque-speed characteristic wherein torque decreases as speed increases. Stepper motor acceleration and deceleration times have been undesirably long due in part to the nature of the available torque characteristic of the motor. In an attempt to counteract this problem, stepper motors have been accelerated and decelerated in accordance with a predetermined velocity profile, or velocity variation as a function of time. However, these methods do not always exploit the full drive capability of the stepper motor, thereby causing the motor to take more time to move a specified distance.

It would, therefore, be highly desirable to provide a method for generating a stepper motor ramp for controlling the times between electrical pulses supplied to the motor for advancing the motor which method exploits the full drive capability of the stepper motor and accelerates the motor as fast as possible while maintaining a torque safety factor and/or safety margin.

OBJECTS AND SUMMARY OF THE INVENTION

It is, therefore, a primary object of this invention to provide a new and improved method for generating a stepper motor ramp for use in controlling the times between electrical pulses supplied for advancing the motor.

It is a further object of this invention to provide such a method which always exploits the full drive capability of the motor.

It is a more particular object of this invention to provide such a method which uses the torque actually available at each speed and during each time interval or step in the motor operation.

It is a further object of this invention to provide such a method which results in acceleration and deceleration of the motor as fast as possible while maintaining a user settable torque safety factor and/or safety margin.

It is a more particular object of the present invention to provide such a method which results in the stepper motor moving a specified distance in the fastest time allowed by a specified usable torque.

It is a further object of the present invention to provide such a method whereby the stepper motor is never required to drive more load torque than it is capable of and no unknown marginal torque conditions are allowed to exist.

It is a further object of this invention to provide such a method for generating a stepper motor ramp which takes advantage of system friction during deceleration.

The present invention provides a method for generating stepper motor ramps and analyzing the motor torque required compared with the motor torque available wherein the generated ramps will accelerate the motor as fast as possible while maintaining a user settable torque safety factor and/or safety margin. The method uses the minimum available stepper motor torque at the current motor speed to ultimately compute the maximum acceleration that can be used, uses the maximum acceleration to generate the next motor step time and hence the next motor velocity, computes the next velocity from the desired acceleration and the previous velocity and takes advantage of the fact that friction will help during deceleration of the motor. In particular, the method comprises the steps of determining the minimum available torque using the current motor velocity and the torque-speed characteristic of the motor, applying to the available torque a safety factor and then a safety margin to determine maximum usable torque wherein the safety factor is derived from motor information and the safety margin is derived from system information, calculating the maximum acceleration using the friction and moment of inertia of the system and the maximum usable motor torque, calculating the time duration of the next step for advancing the motor, repeating the foregoing steps to determine all steps in the ramps, and utilizing the generated motor ramps in advancing the stepper motor. The ramp generated according to the method of the present invention always exploits the full drive capability of the stepper motor, and it provides a relatively constant margin between available torque and required torque during both acceleration and deceleration of the motor.

The foregoing and additional advantages and characterizing features of the present invention will become clearly apparent upon a reading of the ensuing detailed description together with the included drawing wherein:

DESCRIPTION OF THE PREFERRED EMBODIMENT

Figure 1:
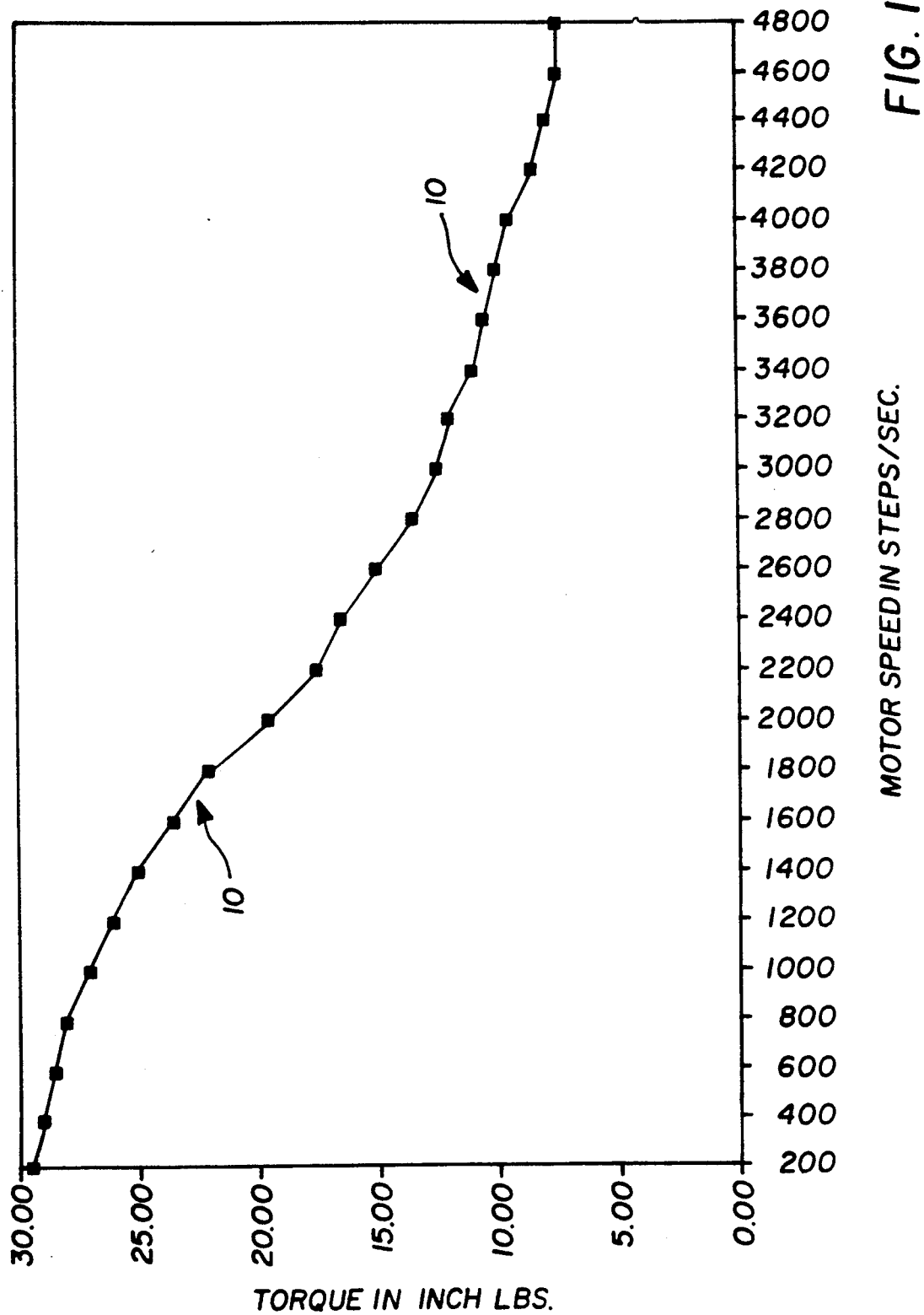
FIG. 1 is a graph of stall torque vs. speed for an illustrative stepper motor.

When utilizing stepper motors in system applications, attention must be given to the requirement that the motor produce adequate torque to drive the load. The torque required to accelerate a constant inertia and drive a frictional load is given by the relationship:

$$T = am + fr$$

where T is the torque load in inch-lbs., a is the angular acceleration in radians/sec², m is the moment of inertia in inch-lb.-sec, f is the friction in lbs. and r is the radius of moment arm in inches. From the foregoing the maximum allowable acceleration can be calculated from the maximum usable torque as follows:

$$a = (T - fr)/m$$

where T is the maximum usable torque in inch-lbs. and a is the maximum allowable angular acceleration in radians/sec². In the foregoing relationship, torque is positive for acceleration and negative for deceleration so that when dealing with a frictional load, the absolute value of "a" is higher for a deceleration, although for a deceleration "a" is negative.

From the above two relationships it is apparent that the stepper motor acceleration must have an absolute value low enough so that the motor provides enough output torque to overcome the moment of inertia of the system, while maintaining enough torque in reserve to drive or overcome the friction in the system. There must also be a safety factor and/or margin to be maintained between the torque required to drive this combined load, i.e. inertia and friction, and the minimum torque available from the motor at any speed. This safety factor/margin is required to account for any variations among motors and systems. These concerns are also influenced by the length of time required to move the motor a particular distance, i.e. advance the motor a predetermined number of steps.

Heretofore, stepper motor ramp generation usually has involved making the motor velocity follow a particular mathematical function, such as a straight line (constant acceleration) or a parabola (very low acceleration at peak speed). These ramp generation methods do not always exploit the full drive capability of the stepper motor, causing the motor to take more time to move a specified distance. The drive capability of the motor also can be easily exceeded if care is not taken during system design. In any case, the safety margin between torque required and torque available will vary, and this can lead to marginal torque conditions where the stepper motor may fail intermittently.

In accordance with the present invention, there is provided a procedure for generating stepper motor ramps, and analyzing the torque required compared with the torque available. The generated ramps will accelerate the stepper motor as fast as possible while maintaining a user settable torque safety factor and/or safety margin. Thus, in the method of the present invention there is no attempt to follow a mathematical function. Instead, the maximum torque is utilized during each motor step, taking into account the velocity plus a safety factor and margin.

The first step in the method of the present invention is determining the minimum available torque of the stepper motor using the current motor velocity and the torque-speed characteristic of the motor. An example is illustrated in FIG. 1 which is a graph of stepper motor stall torque in inch-lbs. vs. motor speed in steps/sec. As shown by curve 10 in FIG. 1, the torque decreases from about 29.5 inch-lbs to about 7.50 inch-lbs as the speed increases from about 200 steps/sec to about 4800 steps/sec. Data for the graph of FIG. 1 was obtained from a stepper motor/driver combination functioning as a paper metering motor at the output of a photographic printer of the type commercially available from Eastman Kodak Company under the designation CLAS35 Color Printer. A graph like that of FIG. 1 can be prepared by taking the actual steppermotor/driver combination which is to be used in a particular system application and connecting the combination to a dynamometer, operating the motor at given speed, applying incremental loads to the motor/driver combination via the dynamometer until the motor stalls, recording the torque value at stalling and repeating the procedure for a series of motor speeds to obtain a stall torque-speed characteristic. Table I is a look-up table obtained from the data of FIG. 1 which facilitates inputting the data into a computer as will be described presently. Alternatively, it would be necessary to develop a mathematical function approximating the curve of FIG. 1 for inputting to a computer

TABLE I

| Stall Torque At Various Speeds | | | |
|---|---|---|---|
| Velocity Steps/Sec | Stall Torque inch lbs. | Velocity Steps/Sec | Stall Torque inch lbs. |
| 200 | 29.50 | 2600 | 15.00 |
| 400 | 29.00 | 2800 | 13.50 |
| 600 | 28.50 | 3000 | 12.50 |
| 800 | 28.00 | 3200 | 12.00 |
| 1000 | 27.00 | 3400 | 11.00 |
| 1200 | 26.00 | 3600 | 10.50 |
| 1400 | 25.00 | 3800 | 10.00 |
| 1600 | 23.50 | 4000 | 9.50 |
| 1800 | 22.00 | 4200 | 8.50 |
| 2000 | 19.50 | 4400 | 8.00 |
| 2200 | 17.50 | 4600 | 7.50 |
| 2400 | 16.50 | 4800 | 7.50 |

Thus, the data obtained during the foregoing step is the minimum available stepper motor torque at various motor speeds. The next step in the method of the present invention is applying to that available torque a safety factor and then a safety margin to calculate the maximum usable torque. The safety factor is derived from motor information and the safety margin is derived from information on the system of which the motor is a part. Different safety factors and safety margins can be applied to specific motor velocities or steps as needed to overcome transient conditions, such as static friction. The equation for calculating maximum usable torque is as follows:

$$T_{usable} = T_{available} \text{ (Safety Factor)} - \text{Safety Margin}$$

where 0 < Safety Factor < 1 and Safety Margin < T available (Safety Factor).

The safety factor is derived from information pertaining to the stepper motor. In particular characteristics of motors selected for an application including manufacturing tolerances of the motors are considered and compared to the torque-speed characteristic developed in the first step of the method. For example if the manufacturer of a stepper motor selected for a particular application indicates that motor torque is accurate to within a 15% tolerance, then the safety factor used in the foregoing equation would be 0.85, i.e. 1−0.15. Thus, safety factor in the foregoing equation can be expressed as 1-tolerance value.

The safety margin is derived from information on the system of which the stepper motor is a part. Basically, the magnitude of the safety margin is determined by the judgment of the designer, taking into account the friction loads which will be encountered in the system during operation. For example, in the photographic printer application previously mentioned, the designer would determine experimentally the kinds of friction loads that would be encountered and how those loads would be affected by operating conditions and such factors as temperature, nature of materials, etc. From such experimental determination the designer then would arrive at a safety margin he is comfortable with.

The next step in the method of the present invention is calculating the maximum possible system acceleration for the next motor step using the system friction, system moment of inertia and maximum usable motor torque at the current motor speed. The term "system" means the motor and what it drives. The maximum usable motor torque was calculated during the preceding step. The maximum possible system acceleration, $a_n$, is obtained from the equation:

$$a_n = (T_{usable} - fr)/m$$

where fr is the product of system friction and the system moment arm and m is the system moment of inertia. When up-ramps are being generated one should use the maximum system friction expected, and when down-ramps are being generated one should use the minimum system friction expected. In this connection, deceleration is aided by friction and acceleration is hindered by friction. An important aspect and advantage of the present invention is that in generating the stepper motor ramps the method takes advantage of the fact that deceleration is aided by the friction.

The next step in the method of the present invention is calculating the time duration of the next step for advancing the motor. This calculation is performed using the following series of equations. First the acceleration is given by:

$$a_n = \Delta V/t_n$$

where $t_n$ is the time per step and $\Delta V = Vn - Vn-1$ where n is the number of the current step being calculated. Next, the time per step, tn, is given by:

$$tn = 1/Vn$$

so that the acceleration can be expressed by:

$$a_n = (Vn - Vn-1)/(1/Vn)$$

$$a_n = (Vn - Vn-1)(Vn)$$

$$a_n = Vn^2 - (Vn-1)(Vn)$$

This provides the following equation which is quadratic in Vn:

$$Vn^2 - Vn-1(Vn) - a_n = 0$$

and which has the roots:

$$Vn = \frac{Vn-1 \pm \sqrt{Vn-1^2 + 4a_n}}{2}$$

where the +root yields Vn and the negative root yields $\Delta V$. Thus the positive root yields the desired result from:

$$Tn = 1/Vn$$

Next, the foregoing procedure is repeated to determine all of the desired steps in the ramp. For the next steps the Tn just calculated becomes tn−1, etc. The above equations, look-up table and procedure are easily implemented on a computer with a spread sheet program or as part of the on-line stepper motor algorithm. Although more complex methods of handling the ramp creation can be used, the simplest form is with a spreadsheet. This method may require manual intervention and iteration to pick a step in the ramp to start deceleration to arrive at zero velocity in the required number of steps. This will be illustrated by an example to be described presently. Other methods, such as starting at both ends of the ramp and working towards the peak velocity near the middle of the ramp, are possible.

Figure 2:
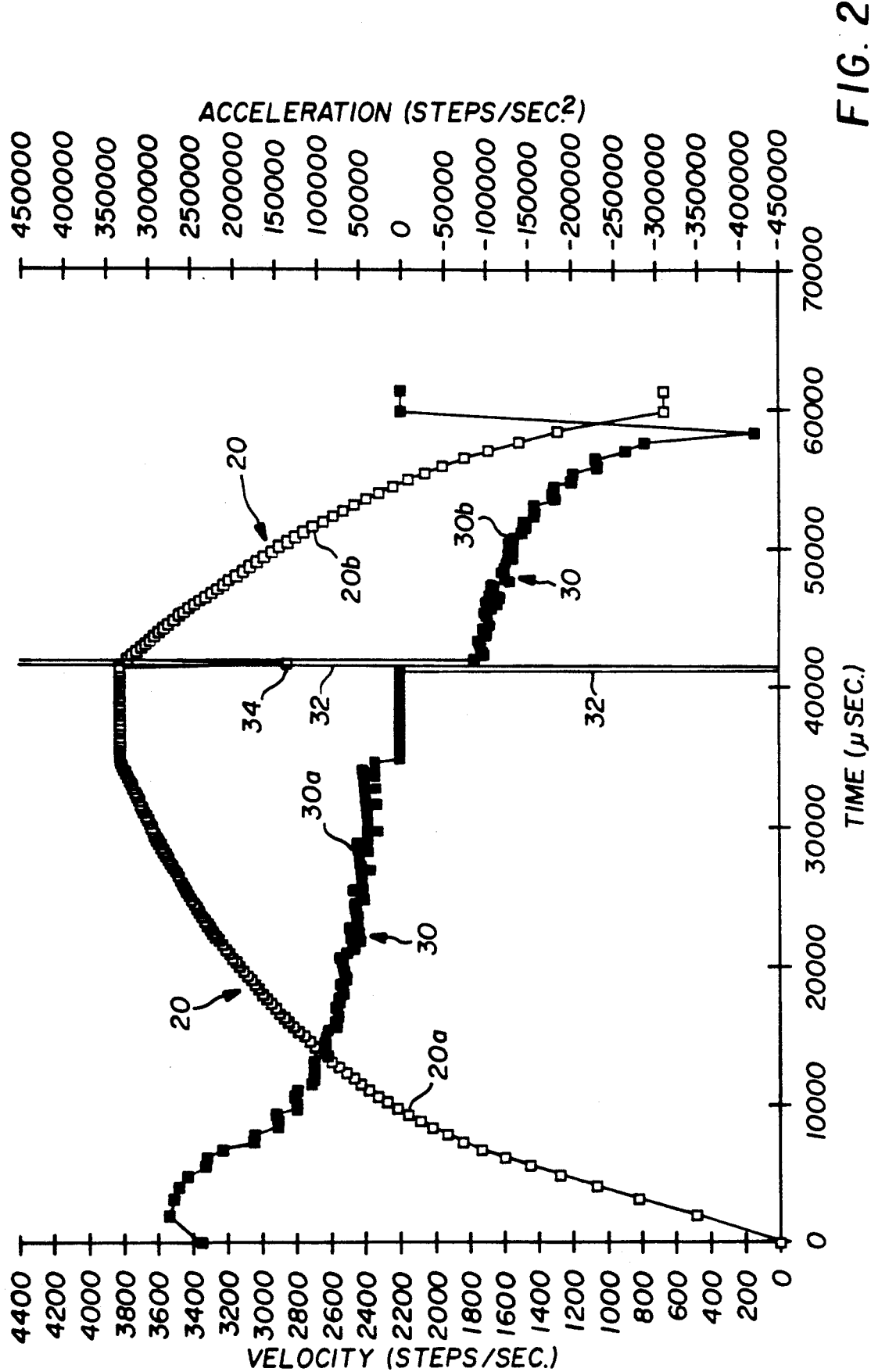
FIG. 2 is a graph illustrating the stepper motor ramp generated according to the present invention.
Figure 3:
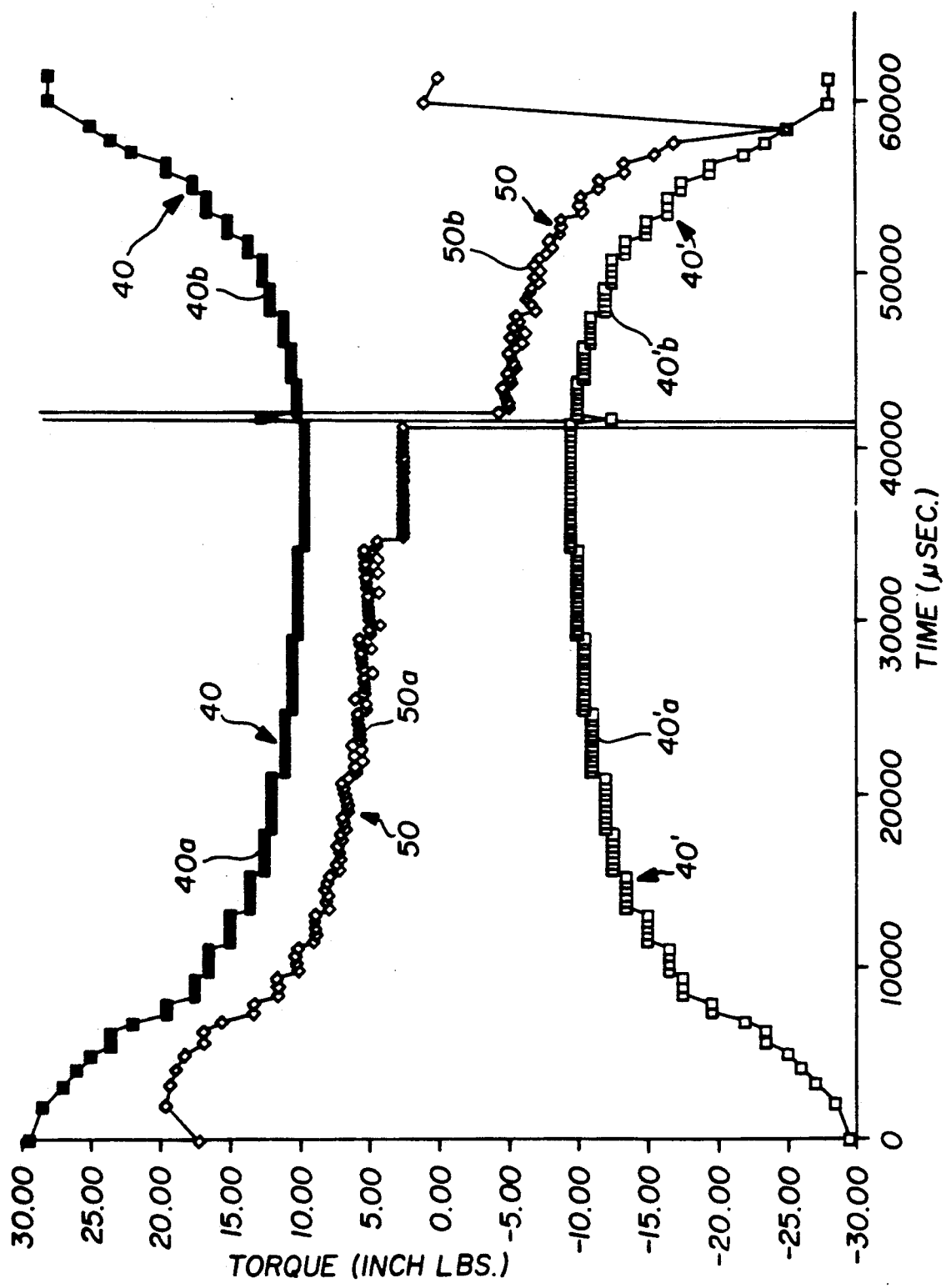
FIG. 3 is a graph of torque available/required vs. time with safety factor/safety margin applied and further illustrating the present invention.

The method of the present invention is illustrated by the stepper motor profile set forth in Tables II and III and by graphs in FIGS. 2 and 3. The stepper motor profile was developed for the previously mentioned example of a paper metering motor in a photographic printer. The profile was optimized for the minimum high speed advance length of 4.5 inches, and longer advances were obtained by adding cruise steps, i.e. zero acceleration, in the middle of the profile for simplicity since motor torque was limited at this speed. The 168 steps indicated in the first column of Table II correspond to operation of the stepper motor to advance a paper strip a distance of about 5.25 inches. During the first portion of the distance travelled the motor profile ramps up corresponding to acceleration of the stepper motor. The ramp up portion occurs during steps 1-94 wherein the acceleration is positive. During the final portion of the distance travelled the motor profile ramp down corresponds to deceleration of the stepper motor. The ramp down portion occurs during steps 119-168 wherein the acceleration is negative.

The first step in the method of the present invention, determining the minimum available torque of the stepper motor, is illustrated by the last two columns of Table II. For example, the data in the second last column is obtained in a manner similar to that described in connection with the stall torque characteristic of FIG. 1, taking into account the fact that the motor accelerates during the first portion of the trip and decelerates during the remaining portion. The data in the last column is a mirror image of that in the previous column for a purpose which will become apparent.

The quantities in the column headed "Torque Required" are obtained from the next step in the method of the present invention, i.e. applying to the available torque a safety

TABLE II

| | | | Motor Profile with 4 in. lbs. S.M. and 10% S.F. | | | | | |
|---|---|---|---|---|---|---|---|---|
| Step # | Cum. Time (μsec) | Velocity (Steps/Sec) | Acceleration (Steps/Sec 2) | Step Time (μsec/Step) | # Clock Ticks | Torque Required (in-lbs) | Torque Pos. Avail. (in-lbs) | Torque Neg. Avail. (in-lbs) |
| 1 | 0 | 0 | 236707 | | | 17.26 | 29.50 | −29.50 |

TABLE II-continued

| | | | Motor Profile with 4 in. lbs. S.M. and 10% S.F. | | | | | |
|---|---|---|---|---|---|---|---|---|
| Step # | Cum. Time (μsec) | Velocity (Steps/Sec) | Acceleration (Steps/Sec 2) | Step Time (μsec/Step) | # Clock Ticks | Torque Required (in-lbs) | Torque Pos. Avail. (in-lbs) | Torque Neg. Avail. (in-lbs) |
| 2 | 2055 | 487 | 274421 | 2055 | 7577 | 19.61 | 28.50 | −28.50 |
| 3 | 3274 | 821 | 269162 | 1218 | 4491 | 19.28 | 27.00 | −27.00 |
| 4 | 4207 | 1072 | 263021 | 933 | 3439 | 18.90 | 26.00 | −26.00 |
| 5 | 4989 | 1278 | 252819 | 783 | 2885 | 18.26 | 25.00 | −25.00 |
| 6 | 5678 | 1452 | 230899 | 689 | 2539 | 16.89 | 23.50 | −23.50 |
| 7 | 6304 | 1597 | 230693 | 626 | 2309 | 16.88 | 23.50 | −23.50 |
| 8 | 6882 | 1730 | 210654 | 578 | 2131 | 15.63 | 22.00 | −22.00 |
| 9 | 7425 | 1844 | 174032 | 542 | 1999 | 13.35 | 19.50 | −19.50 |
| 10 | 7942 | 1934 | 173397 | 517 | 1906 | 13.31 | 19.50 | −19.50 |
| 11 | 8437 | 2020 | 145974 | 495 | 1825 | 11.60 | 17.50 | −17.50 |
| 12 | 8915 | 2090 | 145072 | 479 | 1764 | 11.54 | 17.50 | −17.50 |
| 13 | 9379 | 2157 | 147524 | 464 | 1709 | 11.70 | 17.50 | −17.50 |
| 14 | 9829 | 2223 | 121953 | 450 | 1658 | 10.10 | 16.50 | −16.50 |
| 15 | 10268 | 2277 | 124093 | 439 | 1619 | 10.24 | 16.50 | −16.50 |
| 16 | 10697 | 2330 | 125628 | 429 | 1582 | 10.33 | 16.50 | −16.50 |
| 17 | 11117 | 2383 | 122473 | 420 | 1547 | 10.14 | 16.50 | −16.50 |
| 18 | 11528 | 2433 | 105190 | 411 | 1515 | 9.06 | 15.00 | −15.00 |
| 19 | 11931 | 2476 | 102058 | 404 | 1489 | 8.86 | 15.00 | −15.00 |
| 20 | 12329 | 2516 | 102604 | 397 | 1465 | 8.90 | 15.00 | −15.00 |
| 21 | 12720 | 2556 | 102822 | 391 | 1442 | 8.91 | 15.00 | −15.00 |
| 22 | 13105 | 2596 | 102683 | 385 | 1420 | 8.90 | 15.00 | −15.00 |
| 23 | 13485 | 2635 | 86461 | 380 | 1399 | 7.89 | 13.50 | −15.00 |
| 24 | 13860 | 2667 | 89718 | 375 | 1382 | 8.09 | 13.50 | −13.50 |
| 25 | 14230 | 2701 | 87532 | 370 | 1365 | 7.96 | 13.50 | −13.50 |
| 26 | 14596 | 2733 | 90709 | 366 | 1349 | 8.15 | 13.50 | −13.50 |
| 27 | 14957 | 2765 | 88031 | 362 | 1333 | 7.99 | 13.50 | −13.50 |
| 28 | 15315 | 2797 | 84891 | 358 | 1318 | 7.79 | 13.50 | −13.50 |
| 29 | 15669 | 2827 | 74918 | 354 | 1304 | 7.17 | 12.50 | −13.50 |
| 30 | 16019 | 2853 | 77038 | 350 | 1292 | 7.30 | 12.50 | −12.50 |
| 31 | 16366 | 2880 | 72521 | 347 | 1280 | 7.02 | 12.50 | −12.50 |
| 32 | 16711 | 2905 | 74435 | 344 | 1269 | 7.14 | 12.50 | −12.50 |
| 33 | 17052 | 2930 | 76416 | 341 | 1258 | 7.26 | 12.50 | −12.50 |
| 34 | 17390 | 2956 | 71220 | 338 | 1247 | 6.94 | 12.50 | −12.50 |
| 35 | 17726 | 2980 | 72970 | 336 | 1237 | 7.05 | 12.50 | −12.50 |
| 36 | 18059 | 3004 | 67191 | 333 | 1227 | 6.69 | 12.00 | −12.00 |
| 37 | 18389 | 3027 | 68699 | 330 | 1218 | 6.78 | 12.00 | −12.00 |
| 38 | 18717 | 3049 | 70252 | 328 | 1209 | 6.88 | 12.00 | −12.00 |
| 39 | 19042 | 3072 | 63762 | 326 | 1200 | 6.47 | 12.00 | −12.00 |
| 40 | 19366 | 3093 | 65060 | 323 | 1192 | 6.56 | 12.00 | −12.00 |
| 41 | 19687 | 3114 | 66394 | 321 | 1184 | 6.64 | 12.00 | −12.00 |
| 42 | 20006 | 3135 | 67764 | 319 | 1176 | 6.72 | 12.00 | −12.00 |
| 43 | 20323 | 3156 | 69173 | 317 | 1168 | 6.81 | 12.00 | −12.00 |
| 44 | 20637 | 3178 | 70621 | 315 | 1160 | 6.90 | 12.00 | −12.00 |
| 45 | 20950 | 3200 | 62985 | 313 | 1152 | 6.43 | 12.00 | −12.00 |
| 46 | 21261 | 3220 | 54891 | 311 | 1145 | 5.92 | 11.00 | −11.00 |
| 47 | 21570 | 3237 | 55766 | 309 | 1139 | 5.98 | 11.00 | −11.00 |
| 48 | 21877 | 3254 | 47133 | 307 | 1133 | 5.44 | 11.00 | −11.00 |
| 49 | 22183 | 3268 | 57420 | 306 | 1128 | 6.08 | 11.00 | −11.00 |
| 50 | 22487 | 3286 | 48537 | 304 | 1122 | 5.53 | 11.00 | −11.00 |
| 51 | 22790 | 3300 | 59139 | 303 | 1117 | 6.19 | 11.00 | −11.00 |
| 52 | 23092 | 3318 | 49998 | 301 | 1111 | 5.62 | 11.00 | −11.00 |
| 53 | 23392 | 3333 | 50681 | 300 | 1106 | 5.66 | 11.00 | −11.00 |
| 54 | 23690 | 3348 | 51377 | 299 | 1101 | 5.70 | 11.00 | −11.00 |
| 55 | 23988 | 3364 | 52085 | 297 | 1096 | 5.75 | 11.00 | −11.00 |
| 56 | 24284 | 3379 | 52807 | 296 | 1091 | 5.79 | 11.00 | −11.00 |
| 57 | 24578 | 3394 | 53542 | 295 | 1086 | 5.84 | 11.00 | −11.00 |
| 58 | 24871 | 3410 | 43352 | 293 | 1081 | 5.20 | 10.50 | −10.50 |
| 59 | 25164 | 3423 | 43838 | 292 | 1077 | 5.23 | 10.50 | −10.50 |
| 60 | 25455 | 3436 | 55518 | 291 | 1073 | 5.96 | 10.50 | −10.50 |
| 61 | 25744 | 3452 | 44958 | 290 | 1068 | 5.30 | 10.50 | −10.50 |
| 62 | 26033 | 3465 | 45469 | 289 | 1064 | 5.33 | 10.50 | −10.50 |
| 63 | 26321 | 3478 | 45987 | 288 | 1060 | 5.37 | 10.50 | −10.50 |
| 64 | 26607 | 3491 | 46512 | 286 | 1056 | 5.40 | 10.50 | −10.50 |
| 65 | 26892 | 3504 | 35218 | 285 | 1052 | 4.70 | 10.50 | −10.50 |
| 66 | 27177 | 3514 | 47452 | 285 | 1049 | 5.46 | 10.50 | −10.50 |
| 67 | 27460 | 3528 | 48001 | 283 | 1045 | 5.49 | 10.50 | −10.50 |
| 68 | 27743 | 3541 | 48558 | 282 | 1041 | 5.53 | 10.50 | −10.50 |
| 69 | 28024 | 3555 | 49123 | 281 | 1037 | 5.56 | 10.50 | −10.50 |
| 70 | 28304 | 3569 | 37201 | 280 | 1033 | 4.82 | 10.50 | −10.50 |
| 71 | 28584 | 3579 | 50134 | 279 | 1030 | 5.63 | 10.50 | −10.50 |
| 72 | 28862 | 3593 | 50724 | 278 | 1026 | 5.66 | 10.50 | −10.50 |
| 73 | 29139 | 3607 | 38417 | 277 | 1022 | 4.89 | 10.00 | −10.00 |
| 74 | 29416 | 3618 | 38758 | 276 | 1019 | 4.92 | 10.00 | −10.00 |
| 75 | 29691 | 3628 | 26017 | 276 | 1016 | 4.12 | 10.00 | −10.00 |
| 76 | 29966 | 3636 | 39336 | 275 | 1014 | 4.95 | 10.00 | −10.00 |
| 77 | 30241 | 3646 | 39688 | 274 | 1011 | 4.97 | 10.00 | −10.00 |
| 78 | 30514 | 3657 | 40044 | 273 | 1008 | 5.00 | 10.00 | −10.00 |
| 79 | 30787 | 3668 | 40404 | 273 | 1005 | 5.02 | 10.00 | −10.00 |

TABLE II-continued
Motor Profile with 4 in. lbs. S.M. and 10% S.F.

| Step # | Cum. Time (μsec) | Velocity (Steps/Sec) | Acceleration (Steps/Sec 2) | Step Time (μsec/Step) | # Clock Ticks | Torque Required (in-lbs) | Torque Pos. Avail. (in-lbs) | Torque Neg. Avail. (in-lbs) |
|---|---|---|---|---|---|---|---|---|
| 80 | 31058 | 3679 | 40769 | 272 | 1002 | 5.04 | 10.00 | −10.00 |
| 81 | 31329 | 3690 | 41138 | 271 | 999 | 5.06 | 10.00 | −10.00 |
| 82 | 31600 | 3701 | 27619 | 270 | 996 | 4.22 | 10.00 | −10.00 |
| 83 | 31869 | 3709 | 41763 | 270 | 994 | 5.10 | 10.00 | −10.00 |
| 84 | 32138 | 3720 | 42144 | 269 | 991 | 5.13 | 10.00 | −10.00 |
| 85 | 32406 | 3731 | 42530 | 268 | 988 | 5.15 | 10.00 | −10.00 |
| 86 | 32673 | 3743 | 28556 | 267 | 985 | 4.28 | 10.00 | −10.00 |
| 87 | 32940 | 3750 | 43184 | 267 | 983 | 5.19 | 10.00 | −10.00 |
| 88 | 33206 | 3762 | 43582 | 266 | 980 | 5.22 | 10.00 | −10.00 |
| 89 | 33471 | 3773 | 29264 | 265 | 977 | 4.32 | 10.00 | −10.00 |
| 90 | 33735 | 3781 | 44258 | 264 | 975 | 5.26 | 10.00 | −10.00 |
| 91 | 33999 | 3793 | 44670 | 264 | 972 | 5.28 | 10.00 | −10.00 |
| 92 | 34262 | 3804 | 29996 | 263 | 969 | 4.37 | 9.50 | −9.50 |
| 93 | 34524 | 3812 | 30182 | 262 | 967 | 4.38 | 9.50 | −9.50 |
| 94 | 34786 | 3820 | 0 | 262 | 965 | 2.50 | 9.50 | −9.50 |
| 95 | 35048 | 3820 | 0 | 262 | 965 | 2.50 | 9.50 | −9.50 |
| 96 | 35310 | 3820 | 0 | 262 | 965 | 2.50 | 9.50 | −9.50 |
| 97 | 35571 | 3820 | 0 | 262 | 965 | 2.50 | 9.50 | −9.50 |
| 98 | 35833 | 3820 | 0 | 262 | 965 | 2.50 | 9.50 | −9.50 |
| 99 | 36095 | 3820 | 0 | 262 | 965 | 2.50 | 9.50 | −9.50 |
| 100 | 36357 | 3820 | 0 | 262 | 965 | 2.50 | 9.50 | −9.50 |
| 101 | 36618 | 3820 | 0 | 262 | 965 | 2.50 | 9.50 | −9.50 |
| 102 | 36880 | 3820 | 0 | 262 | 965 | 2.50 | 9.50 | −9.50 |
| 103 | 37142 | 3820 | 0 | 262 | 965 | 2.50 | 9.50 | −9.50 |
| 104 | 37404 | 3820 | 0 | 262 | 965 | 2.50 | 9.50 | −9.50 |
| 105 | 37665 | 3820 | 0 | 262 | 965 | 2.50 | 9.50 | −9.50 |
| 106 | 37927 | 3820 | 0 | 262 | 965 | 2.50 | 9.50 | −9.50 |
| 107 | 38189 | 3820 | 0 | 262 | 965 | 2.50 | 9.50 | −9.50 |
| 108 | 38451 | 3820 | 0 | 262 | 965 | 2.50 | 9.50 | −9.50 |
| 109 | 38713 | 3820 | 0 | 262 | 965 | 2.50 | 9.50 | −9.50 |
| 110 | 38974 | 3820 | 0 | 262 | 965 | 2.50 | 9.50 | −9.50 |
| 111 | 39236 | 3820 | 0 | 262 | 965 | 2.50 | 9.50 | −9.50 |
| 112 | 39498 | 3820 | 0 | 262 | 965 | 2.50 | 9.50 | −9.50 |
| 113 | 39760 | 3820 | 0 | 262 | 965 | 2.50 | 9.50 | −9.50 |
| 114 | 40021 | 3820 | 0 | 262 | 965 | 2.50 | 9.50 | −9.50 |
| 115 | 40283 | 3820 | 0 | 262 | 965 | 2.50 | 9.50 | −9.50 |
| 116 | 40545 | 3820 | 0 | 262 | 965 | 2.50 | 9.50 | −9.50 |
| 117 | 40807 | 3820 | 0 | 262 | 965 | 2.50 | 9.50 | −9.50 |
| 118 | 41069 | 3820 | 0 | 262 | 965 | 2.50 | 9.50 | −9.50 |
| 119 | 41330 | 3820 | −2758674 | 262 | 965 | −169.48 | 9.50 | −9.50 |
| 120 | 41681 | 2853 | 3452982 | 350 | 1292 | 216.26 | 12.50 | −12.50 |
| 121 | 41946 | 3769 | −86105 | 265 | 978 | −4.37 | 10.00 | −10.00 |
| 122 | 42213 | 3746 | −98437 | 267 | 984 | −5.14 | 10.00 | −10.00 |
| 123 | 42482 | 3720 | −96376 | 269 | 991 | −5.01 | 10.00 | −10.00 |
| 124 | 42753 | 3694 | −94371 | 271 | 998 | −4.88 | 10.00 | −10.00 |
| 125 | 43025 | 3668 | −92422 | 273 | 1005 | −4.76 | 10.00 | −10.00 |
| 126 | 43300 | 3643 | −90526 | 275 | 1012 | −4.64 | 10.00 | −10.00 |
| 127 | 43576 | 3618 | −101153 | 276 | 1019 | −5.31 | 10.00 | −10.00 |
| 128 | 43855 | 3589 | −98820 | 279 | 1027 | −5.16 | 10.50 | −10.50 |
| 129 | 44135 | 3562 | −96557 | 281 | 1035 | −5.02 | 10.50 | −10.50 |
| 130 | 44418 | 3534 | −105957 | 283 | 1043 | −5.61 | 10.50 | −10.50 |
| 131 | 44704 | 3504 | −103276 | 285 | 1052 | −5.44 | 10.50 | −10.50 |
| 132 | 44992 | 3474 | −100685 | 288 | 1061 | −5.28 | 10.50 | −10.50 |
| 133 | 45282 | 3445 | −98179 | 290 | 1070 | −5.12 | 10.50 | −10.50 |
| 134 | 45575 | 3416 | −106201 | 293 | 1079 | −5.62 | 10.50 | −10.50 |
| 135 | 45870 | 3385 | −113445 | 295 | 1089 | −6.07 | 11.00 | −11.00 |
| 136 | 46168 | 3351 | −100269 | 298 | 1100 | −5.25 | 11.00 | −11.00 |
| 137 | 46469 | 3321 | −116702 | 301 | 1110 | −6.28 | 11.00 | −11.00 |
| 138 | 46774 | 3286 | −103787 | 304 | 1122 | −5.47 | 11.00 | −11.00 |
| 139 | 47081 | 3254 | −109786 | 307 | 1133 | −5.84 | 11.00 | −11.00 |
| 140 | 47392 | 3220 | −106393 | 311 | 1145 | −5.63 | 11.00 | −11.00 |
| 141 | 47706 | 3186 | −128265 | 314 | 1157 | −7.00 | 12.00 | −12.00 |
| 142 | 48024 | 3145 | −123443 | 318 | 1172 | −6.70 | 12.00 | −12.00 |
| 143 | 48346 | 3106 | −118860 | 322 | 1187 | −6.41 | 12.00 | −12.00 |
| 144 | 48672 | 3067 | −121934 | 326 | 1202 | −6.60 | 12.00 | −12.00 |
| 145 | 49002 | 3027 | −124358 | 330 | 1218 | −6.75 | 12.00 | −12.00 |
| 146 | 49337 | 2985 | −132952 | 335 | 1235 | −7.29 | 12.50 | −12.50 |
| 147 | 49677 | 2940 | −127059 | 340 | 1254 | −6.92 | 12.50 | −12.50 |
| 148 | 50023 | 2896 | −133884 | 345 | 1273 | −7.35 | 12.50 | −12.50 |
| 149 | 50374 | 2849 | −127538 | 351 | 1294 | −6.95 | 12.50 | −12.50 |
| 150 | 50730 | 2803 | −132768 | 357 | 1315 | −7.28 | 12.50 | −12.50 |
| 151 | 51093 | 2755 | −141936 | 363 | 1338 | −7.85 | 13.50 | −13.50 |
| 152 | 51463 | 2703 | −148897 | 370 | 1364 | −8.28 | 13.50 | −13.50 |
| 153 | 51841 | 2646 | −144532 | 378 | 1393 | −8.01 | 13.50 | −13.50 |
| 154 | 52227 | 2591 | −157236 | 386 | 1423 | −8.80 | 15.00 | −15.00 |
| 155 | 52623 | 2528 | −158259 | 396 | 1458 | −8.87 | 15.00 | −15.00 |
| 156 | 53028 | 2464 | −157656 | 406 | 1496 | −8.83 | 15.00 | −15.00 |
| 157 | 53445 | 2398 | −182090 | 417 | 1537 | −10.35 | 16.50 | −16.50 |

TABLE II-continued

Motor Profile with 4 in. lbs. S.M. and 10% S.F.

| Step # | Cum. Time (μsec) | Velocity (Steps/Sec) | Acceleration (Steps/Sec 2) | Step Time (μsec/Step) | # Clock Ticks | Torque Required (in-lbs) | Torque Pos. Avail. (in-lbs) | Torque Neg. Avail. (in-lbs) |
|---|---|---|---|---|---|---|---|---|
| 158 | 53876 | 2320 | −179927 | 431 | 1589 | −10.22 | 16.50 | −16.50 |
| 159 | 54323 | 2240 | −180702 | 447 | 1646 | −10.27 | 16.50 | −16.50 |
| 160 | 54787 | 2156 | −200679 | 464 | 1710 | −11.51 | 17.50 | −17.50 |
| 161 | 55273 | 2058 | −202651 | 486 | 1791 | −11.63 | 17.50 | −17.50 |
| 162 | 55784 | 1955 | −230476 | 512 | 1886 | −13.37 | 19.50 | −19.50 |
| 163 | 56331 | 1829 | −230204 | 547 | 2016 | −13.35 | 19.50 | −19.50 |
| 164 | 56922 | 1693 | −265440 | 591 | 2178 | −15.55 | 22.00 | −22.00 |
| 165 | 57581 | 1518 | −287545 | 659 | 2429 | −16.93 | 23.50 | −23.50 |
| 166 | 58353 | 1296 | −418308 | 772 | 2845 | −25.08 | 25.00 | −25.00 |
| 167 | 59811 | 686 | 0 | 1458 | 5376 | 1.00 | 28.00 | −28.00 |
| 168 | 61269 | 686 | #DIV/0! | 1458 | 5376 | #DIV/0! | 28.00 | −28.00 |

| safety factor | inertia oz-in-s2 | max frict in-ozs | min frict in-ozs | radians /step ) | | | |
|---|---|---|---|---|---|---|---|
| 89% | 0.0317 | 40.0 in-lbs | 16.0 in-lbs | 0.0314 | | | |
| safety margin | | 2.5 | 1.0 | | | | |
| 64 | 10/31/90 | | | | | | |

$A^*(tn-tp) = Vn-Vp$  $\quad Vn^*(tn-tp) = step \quad tn-tp = step/Vn$
$A^*step = (Vn-Vp)Vn \quad\quad\quad Vn2-Vp^*Vn-A^*step = 0$
$Vn = (Vp + SQRT(-Vp2 + 4A^*step)) \quad Vn = A^*(tn-tp)+Vp$
$Vn - Vp = (Vp - SQRT(-Vp2 + 4A^*step))/2$
$T^*sf-sa = A^*I+F \quad A = -(T^*sf-sa-F)/I \quad D = (T^*sf-sa+F)/I$

TABLE III

| | | | | | speed | | stps/sec | | | | | | | | | | | | | |
|---|---|---|---|---|---|---|---|---|---|---|---|---|---|---|---|---|---|---|---|---|
| 0 | 400 | 800 | 1000 | 1200 | 1400 | 1600 | 1800 | 2000 | 2200 | 2400 | 2600 | 2800 | 3000 | 3200 | 3400 | 3600 | 3800 | 4000 | 4200 | 4400 |
| | | | | | torque | | in-ozs | | | | | | | | | | | | | |
| 472 | 456 | 432 | 416 | 400 | 376 | 352 | 312 | 280 | 256 | 232 | 216 | 200 | 192 | 176 | 168 | 160 | 152 | 144 | 136 | 128 |
| | | | | | torque | | in-lbs | | | | | | | | | | | | | |
| 29.5 | 28.5 | 27.0 | 26.0 | 25.0 | 23.5 | 22.0 | 19.5 | 17.5 | 16.0 | 14.5 | 13.5 | 12.5 | 12.0 | 11.0 | 10.5 | 10.0 | 9.5 | 9.0 | 8.5 | 8.0 |

| rot stps | torq in-oz | accel rad/s2 | % of max | vcl rad/s | vel stp/s | % V change | time usec | cum-tim msec | ramp cnt/stp | |
|---|---|---|---|---|---|---|---|---|---|---|
| 1 | 472 | 7436 | 55% | 15 | 486 | ****** | 2055 | 2055 | 7577 | |
| 2 | 456 | 8625 | 66% | 26 | 821 | 40.7% | 1218 | 3274 | 4491 | |
| 3 | 432 | 8456 | 68% | 34 | 1072 | 23.4% | 933 | 4206 | 3439 | |
| 4 | 416 | 8260 | 70% | 40 | 1278 | 16.1% | 783 | 4989 | 2885 | |
| 5 | 400 | 7937 | 70% | 46 | 1452 | 12.0% | 689 | 5678 | 2539 | |
| 6 | 376 | 7264 | 69% | 50 | 1597 | 9.1% | 626 | 6304 | 2309 | |
| 7 | 376 | 7264 | 69% | 54 | 1730 | 7.7% | 578 | 6882 | 2131 | |
| 8 | 352 | 6591 | 67% | 58 | 1844 | 6.2% | 542 | 7424 | 1999 | |
| 9 | 312 | 5470 | 64% | 61 | 1934 | 4.7% | 517 | 7941 | 1906 | |
| 10 | 312 | 5470 | 64% | 63 | 2020 | 4.3% | 495 | 8436 | 1825 | |
| 11 | 280 | 4573 | 60% | 66 | 2090 | 3.3% | 478 | 8915 | 1764 | |
| 12 | 280 | 4573 | 60% | 68 | 2157 | 3.1% | 464 | 9379 | 1709 | |
| 13 | 280 | 4573 | 60% | 70 | 2223 | 2.9% | 450 | 9828 | 1658 | |
| 14 | 256 | 3900 | 57% | 72 | 2277 | 2.4% | 439 | 10267 | 1619 | |
| 15 | 256 | 3900 | 57% | 73 | 2331 | 2.3% | 429 | 10697 | 1582 | |
| 16 | 256 | 3900 | 57% | 75 | 2383 | 2.2% | 420 | 11116 | 1547 | |
| 17 | 256 | 3900 | 57% | 76 | 2434 | 2.1% | 411 | 11527 | 1515 | |
| 18 | 232 | 3228 | 53% | 78 | 2475 | 1.7% | 404 | 11931 | 1489 | |
| 19 | 232 | 3228 | 53% | 79 | 2516 | 1.6% | 397 | 12329 | 1465 | |
| 20 | 232 | 3228 | 53% | 80 | 2556 | 1.6% | 391 | 12720 | 1442 | |
| 21 | 232 | 3228 | 53% | 82 | 2596 | 1.5% | 385 | 13105 | 1420 | |
| 22 | 232 | 3228 | 53% | 83 | 2635 | 1.5% | 380 | 13494 | 1399 | |
| 23 | 216 | 2779 | 50% | 84 | 2668 | 1.2% | 375 | 13859 | 1382 | |
| 24 | 216 | 2779 | 50% | 85 | 2701 | 1.2% | 370 | 14230 | 1365 | |
| 25 | 216 | 2779 | 50% | 86 | 2733 | 1.2% | 366 | 14595 | 1349 | * |
| 26 | 216 | 2779 | 50% | 87 | 2765 | 1.2% | 362 | 14957 | 1333 | |
| 27 | 216 | 2779 | 50% | 88 | 2797 | 1.1% | 358 | 15315 | 1318 | |
| 28 | 216 | 2779 | 50% | 89 | 2828 | 1.1% | 354 | 15668 | 1304 | |
| 29 | 200 | 2331 | 46% | 90 | 2854 | 0.9% | 350 | 16019 | 1292 | |
| 30 | 200 | 2331 | 46% | 90 | 2880 | 0.9% | 347 | 16366 | 1280 | |
| 31 | 200 | 2331 | 46% | 91 | 2905 | 0.9% | 344 | 16710 | 1269 | |
| 32 | 200 | 2331 | 46% | 92 | 2931 | 0.9% | 341 | 17051 | 1258 | |
| 33 | 200 | 2331 | 46% | 93 | 2956 | 0.8% | 338 | 17390 | 1247 | |
| 34 | 200 | 2331 | 46% | 94 | 2981 | 0.8% | 335 | 17725 | 1237 | |
| 35 | 200 | 2331 | 46% | 94 | 3005 | 0.8% | 333 | 18058 | 1227 | |
| 36 | 192 | 2106 | 44% | 95 | 3027 | 0.7% | 330 | 18388 | 1218 | |
| 37 | 192 | 2106 | 44% | 96 | 3049 | 0.7% | 328 | 18716 | 1209 | |
| 38 | 192 | 2106 | 44% | 96 | 3071 | 0.7% | 326 | 19042 | 1200 | |
| 39 | 192 | 2106 | 44% | 97 | 3093 | 0.7% | 323 | 19365 | 1192 | |
| 40 | 192 | 2106 | 44% | 98 | 3115 | 0.7% | 321 | 19686 | 1184 | |
| 41 | 192 | 2106 | 44% | 99 | 3136 | 0.7% | 319 | 20005 | 1176 | |
| 42 | 192 | 2106 | 44% | 99 | 3157 | 0.7% | 317 | 20322 | 1168 | |
| 43 | 192 | 2106 | 44% | 100 | 3178 | 0.7% | 315 | 20636 | 1160 | |

TABLE III-continued

| | | | | | | | | | |
|---|---|---|---|---|---|---|---|---|---|
| 44 | 192 | 2106 | 44% | 101 | 3199 | 0.7% | 313 | 20949 | 1152 | |
| 45 | 192 | 2106 | 44% | 101 | 3220 | 0.6% | 311 | 21256 | 1145 | |
| 46 | 176 | 1658 | 39% | 102 | 3236 | 0.5% | 309 | 21568 | 1139 | |
| 47 | 176 | 1658 | 39% | 102 | 3253 | 0.5% | 307 | 21876 | 1133 | |
| 48 | 176 | 1658 | 39% | 103 | 3269 | 0.5% | 306 | 22182 | 1128 | |
| 49 | 176 | 1658 | 39% | 103 | 3285 | 0.5% | 304 | 22486 | 1122 | |
| 50 | 176 | 1658 | 39% | 104 | 3301 | 0.5% | 303 | 22789 | 1117 | |
| 51 | 176 | 1658 | 39% | 104 | 3317 | 0.5% | 302 | 23091 | 1111 | |
| 52 | 176 | 1658 | 39% | 105 | 3332 | 0.5% | 300 | 23391 | 1106 | |
| 53 | 176 | 1658 | 39% | 105 | 3348 | 0.5% | 299 | 23689 | 1101 | |
| 54 | 176 | 1658 | 39% | 106 | 3364 | 0.5% | 297 | 23987 | 1096 | |
| 55 | 176 | 1658 | 39% | 106 | 3380 | 0.5% | 296 | 24283 | 1091 | |
| 56 | 176 | 1658 | 39% | 107 | 3395 | 0.5% | 295 | 24577 | 1086 | |
| 57 | 176 | 1658 | 39% | 107 | 3411 | 0.5% | 293 | 24870 | 1081 | |
| 58 | 168 | 1434 | 36% | 108 | 3424 | 0.4% | 292 | 25162 | 1077 | |
| 59 | 168 | 1434 | 36% | 108 | 3437 | 0.4% | 291 | 25453 | 1073 | |
| 60 | 168 | 1434 | 36% | 108 | 3450 | 0.4% | 290 | 25743 | 1068 | |
| 61 | 168 | 1434 | 36% | 109 | 3464 | 0.4% | 289 | 26032 | 1064 | |
| 62 | 168 | 1434 | 36% | 109 | 3477 | 0.4% | 288 | 26320 | 1060 | |
| 63 | 168 | 1434 | 36% | 110 | 3490 | 0.4% | 287 | 26606 | 1056 | |
| 64 | 168 | 1434 | 36% | 110 | 3503 | 0.4% | 285 | 26892 | 1052 | |
| 65 | 168 | 1434 | 36% | 110 | 3516 | 0.4% | 284 | 27176 | 1049 | |
| 66 | 168 | 1434 | 36% | 111 | 3529 | 0.4% | 283 | 27459 | 1045 | |
| 67 | 168 | 1434 | 36% | 111 | 3542 | 0.4% | 282 | 27742 | 1041 | |
| 68 | 168 | 1434 | 36% | 112 | 3554 | 0.4% | 281 | 28023 | 1037 | |
| 69 | 168 | 1434 | 36% | 112 | 3567 | 0.4% | 280 | 28303 | 1033 | |
| 70 | 168 | 1434 | 36% | 112 | 3580 | 0.4% | 279 | 28583 | 1030 | |
| 71 | 168 | 1434 | 36% | 113 | 3593 | 0.4% | 278 | 28861 | 1026 | |
| 72 | 168 | 1434 | 36% | 113 | 3605 | 0.4% | 277 | 29138 | 1022 | * |
| 73 | 160 | 1209 | 32% | 114 | 3616 | 0.3% | 277 | 29415 | 1019 | * |
| 74 | 160 | 1209 | 32% | 114 | 3627 | 0.3% | 276 | 29691 | 1016 | * |
| 75 | 160 | 1209 | 32% | 114 | 3637 | 0.3% | 275 | 29966 | 1014 | |
| 76 | 160 | 1209 | 32% | 115 | 3648 | 0.3% | 274 | 30240 | 1011 | |
| 77 | 160 | 1209 | 32% | 115 | 3658 | 0.3% | 273 | 30513 | 1008 | |
| 78 | 160 | 1209 | 32% | 115 | 3669 | 0.3% | 273 | 30786 | 1005 | |
| 79 | 160 | 1209 | 32% | 116 | 3679 | 0.3% | 272 | 31058 | 1002 | |
| 80 | 160 | 1209 | 32% | 116 | 3690 | 0.3% | 271 | 31329 | 999 | |
| 81 | 160 | 1209 | 32% | 116 | 3700 | 0.3% | 270 | 31599 | 996 | |
| 82 | 160 | 1209 | 32% | 117 | 3710 | 0.3% | 270 | 31868 | 994 | |
| 83 | 160 | 1209 | 32% | 117 | 3721 | 0.3% | 269 | 32137 | 991 | |
| 84 | 160 | 1209 | 32% | 117 | 3731 | 0.3% | 268 | 32405 | 988 | |
| 85 | 160 | 1209 | 32% | 118 | 3741 | 0.3% | 267 | 32672 | 985 | |
| 86 | 160 | 1209 | 32% | 118 | 3752 | 0.3% | 267 | 32939 | 983 | |
| 87 | 160 | 1209 | 32% | 118 | 3762 | 0.3% | 266 | 33205 | 980 | |
| 88 | 160 | 1209 | 32% | 119 | 3772 | 0.3% | 265 | 33470 | 977 | |
| 89 | 160 | 1209 | 32% | 119 | 3782 | 0.3% | 264 | 33734 | 975 | |
| 90 | 160 | 1209 | 32% | 119 | 3792 | 0.3% | 264 | 33998 | 972 | |
| 91 | 160 | 1209 | 32% | 119 | 3803 | 0.3% | 263 | 34261 | 969 | |
| 92 | 152 | 985 | 28% | 120 | 3811 | 0.2% | 262 | 34523 | 967 | |
| 93 | 152 | 985 | 28% | 120 | 3819 | 0.2% | 262 | 34785 | 965 | |
| 94 | 152 | 0 | 0% | 120 | 3819 | 0.0% | 262 | 35047 | 965 | |
| 95 | 152 | −2749 | 52% | 119 | 3796 | −0.6% | 350 | 35397 | 1292 | |
| 96 | 160 | −2973 | 54% | 118 | 3771 | −0.7% | 265 | 35663 | 978 | |
| 97 | 160 | −2973 | 54% | 118 | 3746 | −0.7% | 267 | 35930 | 984 | |
| 98 | 160 | −2793 | 54% | 117 | 3720 | −0.7% | 269 | 36198 | 991 | |
| 99 | 160 | −2793 | 54% | 116 | 3695 | −0.7% | 271 | 36469 | 998 | |
| 100 | 160 | −2793 | 54% | 115 | 3669 | −0.7% | 273 | 36742 | 1005 | |
| 101 | 160 | −2793 | 54% | 114 | 3643 | −0.7% | 275 | 37016 | 1012 | |
| 102 | 160 | −2793 | 54% | 114 | 3617 | −0.7% | 277 | 37293 | 1019 | |
| 103 | 160 | −2793 | 54% | 113 | 3590 | −0.7% | 279 | 37571 | 1027 | |
| 104 | 168 | −3197 | 55% | 112 | 3562 | −0.8% | 281 | 37852 | 1035 | |
| 105 | 168 | −3197 | 55% | 111 | 3533 | −0.8% | 283 | 38135 | 1043 | |
| 106 | 168 | −3197 | 55% | 110 | 3504 | −0.8% | 285 | 38420 | 1052 | |
| 107 | 168 | −3197 | 55% | 109 | 3474 | −0.8% | 288 | 38708 | 1061 | |
| 108 | 168 | −3197 | 55% | 108 | 3445 | −0.9% | 290 | 38999 | 1070 | |
| 109 | 168 | −3197 | 55% | 107 | 3415 | −0.9% | 293 | 39291 | 1079 | |
| 110 | 168 | −3197 | 55% | 106 | 3385 | −0.9% | 295 | 39587 | 1089 | |
| 111 | 176 | −3422 | 57% | 105 | 3353 | −1.0% | 298 | 39885 | 1100 | |
| 112 | 176 | −3422 | 57% | 104 | 3320 | −1.0% | 301 | 40185 | 1110 | |
| 113 | 176 | −3422 | 57% | 103 | 3287 | −1.0% | 304 | 40490 | 1122 | |
| 114 | 176 | −3422 | 57% | 102 | 3253 | −1.0% | 307 | 40798 | 1133 | |
| 115 | 176 | −3422 | 57% | 101 | 3219 | −1.0% | 311 | 41105 | 1145 | |
| 116 | 176 | −3422 | 57% | 100 | 3185 | −1.1% | 314 | 41422 | 1157 | |
| 117 | 192 | −3870 | 59% | 99 | 3146 | −1.2% | 318 | 41740 | 1177 | |
| 118 | 192 | −3870 | 59% | 98 | 3106 | −1.3% | 322 | 42061 | 1187 | |
| 119 | 192 | −3870 | 59% | 96 | 3066 | −1.3% | 326 | 42388 | 1202 | |
| 120 | 192 | −3870 | 59% | 95 | 3025 | −1.3% | 331 | 42719 | 1218 | |
| 121 | 192 | −3870 | 59% | 94 | 2984 | −1.4% | 335 | 43054 | 1235 | |
| 122 | 200 | −4094 | 60% | 92 | 2940 | −1.5% | 340 | 43394 | 1254 | |
| 123 | 200 | −4094 | 60% | 91 | 2895 | −1.5% | 345 | 43740 | 1273 | |
| 124 | 200 | −4094 | 60% | 90 | 2849 | −1.6% | 351 | 44091 | 1294 | |
| 125 | 200 | −4094 | 60% | 88 | 2803 | −1.6% | 357 | 44447 | 1315 | |

TABLE III-continued

| | | | | | | | | | |
|---|---|---|---|---|---|---|---|---|---|
| 126 | 200 | −4094 | 60% | 87 | 2755 | −1.7% | 363 | 44810 | 1338 |
| 127 | 216 | −4543 | 62% | 85 | 2702 | −1.9% | 370 | 44818 | 1364 |
| 128 | 216 | −4543 | 62% | 83 | 2647 | −2.0% | 378 | 45195 | 1393 |
| 129 | 216 | −4543 | 62% | 81 | 2591 | −2.1% | 386 | 45581 | 1423 |
| 130 | 232 | −4991 | 64% | 79 | 2528 | −2.4% | 396 | 45977 | 1458 |
| 131 | 232 | −4991 | 64% | 77 | 2464 | −2.6% | 406 | 46383 | 1496 |
| 132 | 232 | −4991 | 64% | 75 | 2398 | −2.7% | 417 | 46800 | 1537 |
| 133 | 256 | −5664 | 66% | 73 | 2320 | −3.2% | 431 | 47231 | 1589 |
| 134 | 256 | −5664 | 66% | 70 | 2239 | −3.5% | 447 | 47677 | 1646 |
| 135 | 256 | −5664 | 66% | 68 | 2156 | −3.7% | 464 | 48141 | 1710 |
| 136 | 280 | −6337 | 68% | 65 | 2058 | −4.5% | 486 | 48627 | 1791 |
| 137 | 280 | −6337 | 68% | 61 | 1955 | −5.0% | 512 | 49139 | 1886 |
| 138 | 312 | −7234 | 70% | 57 | 1829 | −6.4% | 547 | 49686 | 2016 |
| 139 | 312 | −7234 | 70% | 53 | 1693 | −7.4% | 591 | 50276 | 2178 |
| 140 | 352 | −8355 | 72% | 48 | 1517 | −10.4% | 659 | 50935 | 2429 |
| 141 | 376 | −9028 | 73% | 41 | 1296 | −14.6% | 772 | 51707 | 2845 |
| 142 | 400 | −9701 | 74% | 31 | 981 | −24.3% | 1458 | 53166 | 5376 |
| 143 | 432 | −10598 | 75% | 15 | 490 | −50.0% | 1458 | 54624 | 5376 |
| 144 | 456 | −11271 | 76% | 0 | 0 | ******* | 81 | 54705 | 300 |
| 4.50 | | | | | | | | | |

* = tuned times factor and then a safety margin to calculate the maximum usable torque. As indicated on Table II, the safety factor is 10% and the safety margin is 4 inch-lbs of torque. Thus the values of "Torque Required" are calculated from the values of "Torque Available". The first series of values actually are less than what would be obtained from a true calculation as previously described, due to the fact that in this particular application it was considered desirable to initially provide added compensation for static friction. Therefore, the friction value was tripled for the first step, doubled for the second step, and multiplied by 1.4 for the third step in this profile. In addition, the last step in the profile was adjusted experimentally to minimize ringing of the stopped motor. This step damping is a common practice with stepper motors, and illustrates the flexibility of this method to adapt to different application conditions.

The next step in the method of the present invention, calculating the maximum possible system acceleration for the next motor step using the system friction, system moment of inertia and maximum usable torque at the current motor speed, is illustrated by the data in the fourth column of Table II headed "Acceleration". In other words, the acceleration values in the fourth column are calculated using the torque required values in the seventh column of Table II and using the mathematical relationship described hereinabove.

Finally, according to the method of the present invention, the time duration of the next step for advancing the motor is calculated. In particular, this is done using the mathematical relationships described hereinabove with the resulting step time durations being listed in the column of Table II headed "Step Time". The stepper motor velocity also is calculated using the relationships described hereinabove and the results are listed in the column of Table II headed "Velocity".

The second column in Table II, headed "Cum. Time" is the cumulative step time derived from the fifth column simply by totaling the preceding quantitites. The sixth column, #Clock Ticks, relates each step time to an equivalent number of microprocessor clock pulses. This is for loading the motor profile into a microprocessor look-up table for controlling a driver-stepper motor combination as will be described presently.

The stepper motor ramp generated according to the method of the present invention in connection with Table II is illustrated by the graph of FIG. 2. In particular, FIG. 2 presents stepper motor velocity/acceleration as a function of time with safety factor and safety margin applied according to the present invention. In FIG. 2 time is the cumulative time from the second column of Table II. Curve 20 is a plot of the stepper motor velocity values from Table II and is the stepper motor ramp according to the present invention. During the ramp-up portion 20a the stepper motor is accelerating and during the ramp-down portion 20b the motor is decelerating. In between portions 20a and 20b the motor is running at constant velocity where the torque delivered is equal to the dynamic friction in the system. Curve 30 is a plot of the stepper motor acceleration values from Table II. During portion 30a the acceleration is positive and during portion 30b the acceleration is negative, i.e. deceleration. The transition from acceleration to deceleration includes an acceleration spike designated 32. As shown in Table II during step 120 a time quantity designated 34 in FIG. 2 is inserted to cause the change from accelertion to deceleration. This time quantity adjustment causes a motor pole torque angle correction which presents oscillations during the transition from acceleration to deceleration.

The present invention is illustrated further by FIG. 3 which presents torque required and torque available vs. cumulative time with safety factor and safety margin applied according to the present invention. In particular, curve 40 is the positive torque available from the second last column in Table II and curve 40' is the negative torque available from the last column in Table II. The portions during acceleration of the stepper motor are designated 40a,40'a and the portions during deceleration are designated 40b, 40b'. Curve 50 is the torque required or torque requested in the seventh column of Table II, the portion during acceleration being designated 50a and the portion during deceleration being designated 50b. Curve 50 in FIG. 3 is the acceleration curve 30 of FIG. 2 multiplied by the system moment of inertia plus the friction in the system according to the relationships previously explained. Of particular importance is the fact that the vertical distance between torque available 40 and torque required 50 in FIG. 3 remains relatively constant over time. This safety margin is an important advantage and distinguishing characteristic of the stepper motor ramp generated according to the present invention. In other words, the full drive capability of the stepper motor is utilized without the required torque ever exceeding the available torque. Furthermore, since the safety margin remains relatively constant during deceleration, better use is made of system friction and available torque during deceleration, another important advantage and distinguishing feature of the present invention.

The stepper motor ramp generated according to the present invention is further illustrated by Table III which is similar to Table II but which is in spread sheet formation and includes the equations previously described for calculating the quantities presented in Table III. As previously mentioned, the spreadsheet approach may require manual intervention and iteration to pick a step in the ramp to start deceleration to arrive at zero velocity in the required number of steps. In the example of Table III, step 94 was chosen for zero acceleration, and negative acceleration and minimum friction started with step 95.

Figure 4:
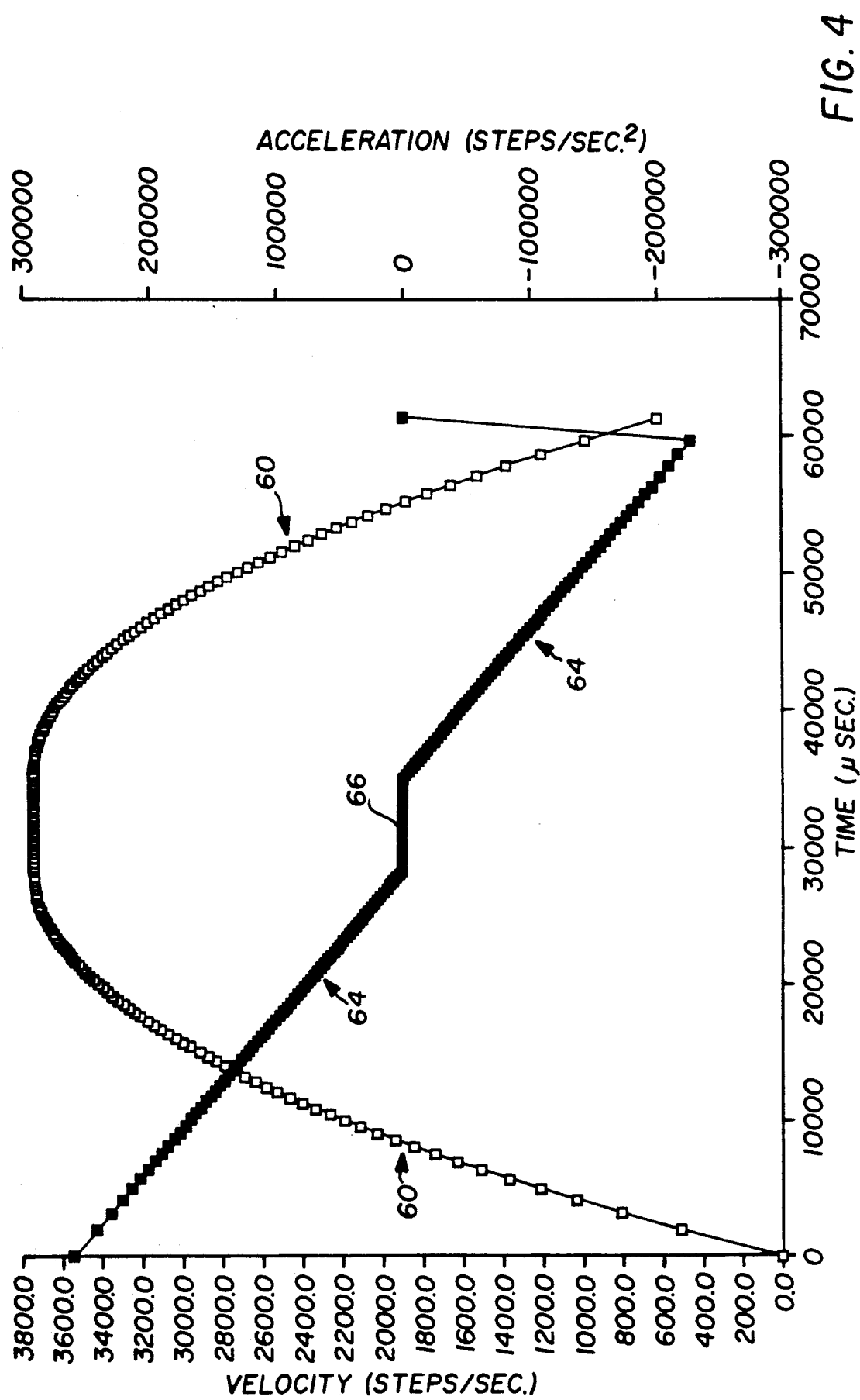
FIG. 4 is a graph illustrating a prior art parabolic stepper motor profile.
Figure 5:
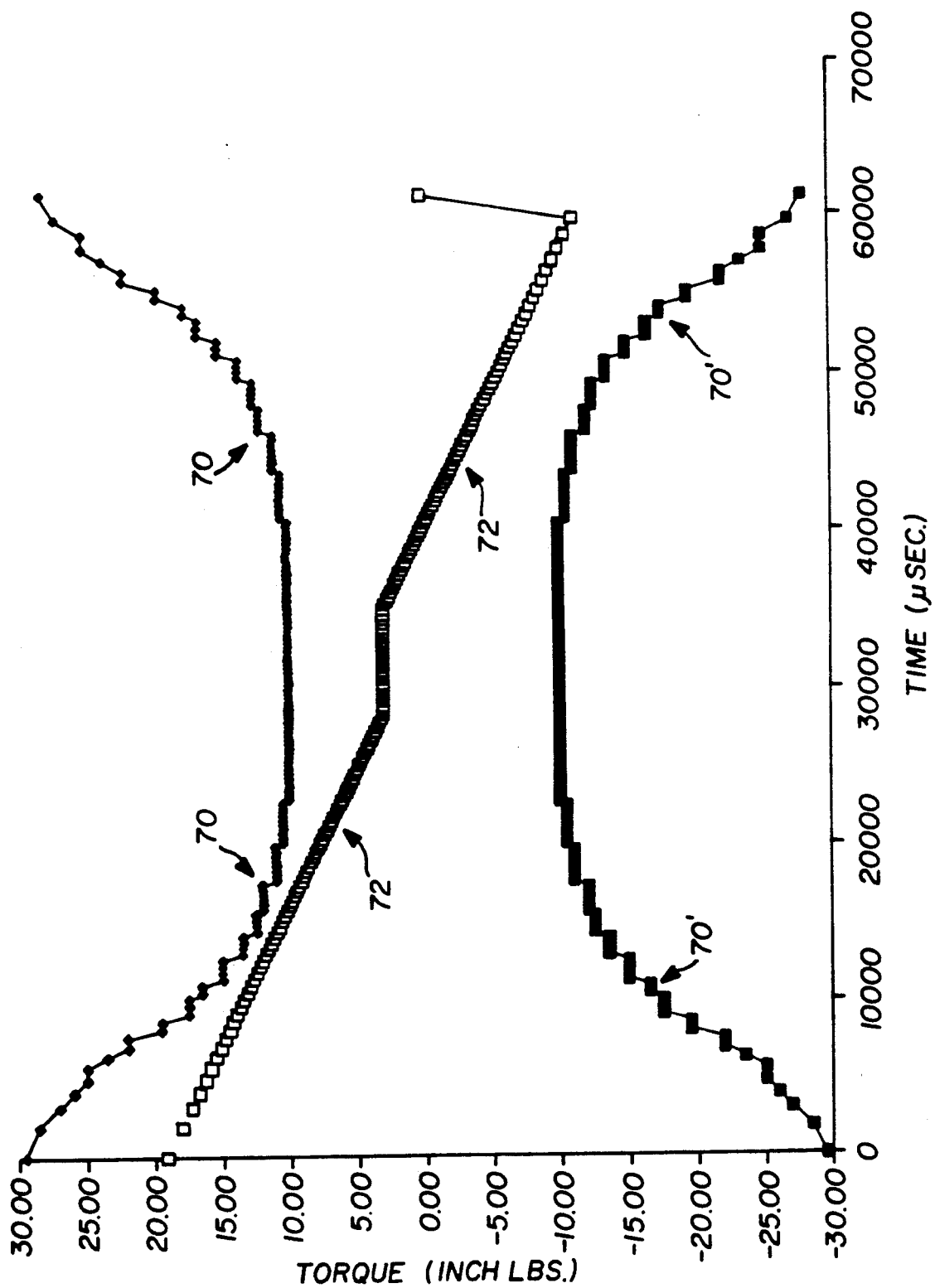
FIG. 5 is a graph further illustrating the profile of FIG. 4.

The stepper motor ramp generated according to the present invention is further illustrated by comparison with a prior art parabolic profile. In particular, a stepper motor parabolic velocity profile was generated according to the procedure disclosed in U.S. Pat. No. 4,714,867 issued Dec. 22, 1987 and entitled "Method And Apparatus For Controlling A Stepper Motor With A Programmable Parabolic Velocity Profile", the disclosure of which is hereby incorporated by reference. The profile is presented in Table IV using a format similar to that of Table II. FIG. 4 is a graph of velocity/acceleration vs. cumulative time prepared from the information in Table IV, and FIG. 5 is a graph of torque required/torque available vs. cumulative time prepared from the information in Table IV.

The parabolic profile represented by curve 60 in FIG. 4 takes approximately the same time to execute, within 0.1% as the profile generated according to the present invention as seen from comparing FIGS. 2 and 4. The peak speed of the parabolic profile 60 also is approximately the same as that of the profile of the present invention, within 2.0%. As illustrated by the acceleration curve 64 in FIG. 4, the break 66 in the middle where the acceleration is flat is due to 26 additional steps that were inserted at peak speed. In particular, the parabolic profile of Table IV also was generated to the same specifications as the profile generated according to the present invention for the particular application of the paper metering motor in a photographic printer. For that application, the requirement was for a

TABLE IV

Parabolic Metering

| Step # | Cum. Time (μsec) | Velocity (Steps/Sec) | Acceleration (Steps/Sec 2) | Step Time (μsec/Step) | # Clock Ticks | Torque Required (in-lbs) | Pos. Avail. (in-lbs) | Neg. Avail. (in-lbs) |
|---|---|---|---|---|---|---|---|---|
| 1 | 0 | 0.0 | 259900 |  |  | 19.20 | 29.50 | −29.50 |
| 2 | 1962 | 509.8 | 241854 | 1961.5 | 7231 | 18.08 | 28.50 | −28.50 |
| 3 | 3198 | 808.8 | 230479 | 1236.4 | 4558 | 17.37 | 27.00 | −27.00 |
| 4 | 4167 | 1032.1 | 221566 | 968.8 | 3572 | 16.81 | 26.00 | −26.00 |
| 5 | 4990 | 1214.6 | 213991 | 823.3 | 3035 | 16.34 | 25.00 | −25.00 |
| 6 | 5720 | 1370.7 | 207279 | 729.6 | 2689 | 15.92 | 25.00 | −25.00 |
| 7 | 6383 | 1508.1 | 201179 | 663.1 | 2444 | 15.54 | 23.50 | −23.50 |
| 8 | 6996 | 1631.4 | 195539 | 613.0 | 2260 | 15.19 | 22.00 | −22.00 |
| 9 | 7569 | 1743.6 | 190263 | 573.5 | 2114 | 14.86 | 22.00 | −22.00 |
| 10 | 8111 | 1846.6 | 185281 | 541.5 | 1996 | 14.55 | 19.50 | −19.50 |
| 11 | 8626 | 1942.0 | 180543 | 514.9 | 1898 | 14.26 | 19.50 | −19.50 |
| 12 | 9118 | 2030.9 | 176013 | 492.4 | 1815 | 13.97 | 17.50 | −17.50 |
| 13 | 9591 | 2114.2 | 171662 | 473.0 | 1744 | 13.70 | 17.50 | −17.50 |
| 14 | 10047 | 2192.5 | 167466 | 456.1 | 1681 | 13.44 | 17.50 | −17.50 |
| 15 | 10488 | 2266.4 | 163406 | 441.2 | 1627 | 13.19 | 16.50 | −16.50 |
| 16 | 10916 | 2336.3 | 159468 | 428.0 | 1578 | 12.94 | 16.50 | −16.50 |
| 17 | 11333 | 2402.7 | 155639 | 416.2 | 1534 | 12.70 | 15.00 | −15.00 |
| 18 | 11738 | 2465.8 | 151908 | 405.5 | 1495 | 12.47 | 15.00 | −15.00 |
| 19 | 12134 | 2525.9 | 148266 | 395.9 | 1459 | 12.24 | 15.00 | −15.00 |
| 20 | 12521 | 2583.3 | 144705 | 387.1 | 1427 | 12.02 | 15.00 | −15.00 |
| 21 | 12900 | 2638.2 | 141217 | 379.0 | 1397 | 11.80 | 13.50 | −13.50 |
| 22 | 13272 | 2690.7 | 137798 | 371.7 | 1370 | 11.59 | 13.50 | −13.50 |
| 23 | 13637 | 2740.9 | 134442 | 364.8 | 1345 | 11.38 | 13.50 | −13.50 |
| 24 | 13995 | 2789.1 | 131143 | 358.5 | 1322 | 11.18 | 13.50 | −13.50 |
| 25 | 14348 | 2835.4 | 127889 | 352.7 | 1300 | 10.97 | 12.50 | −12.50 |
| 26 | 14695 | 2879.8 | 124704 | 347.2 | 1280 | 10.77 | 12.50 | −12.50 |
| 27 | 15037 | 2922.5 | 121556 | 342.2 | 1261 | 10.58 | 12.50 | −12.50 |
| 28 | 15375 | 2693.5 | 118451 | 337.4 | 1244 | 10.38 | 12.50 | −12.50 |
| 29 | 15708 | 3002.9 | 115388 | 333.0 | 1228 | 10.19 | 12.00 | −12.00 |
| 30 | 16037 | 3040.9 | 112362 | 328.9 | 1212 | 10.10 | 12.00 | −12.00 |
| 31 | 16362 | 3077.4 | 109373 | 325.0 | 1198 | 9.82 | 12.00 | −12.00 |
| 32 | 16683 | 3112.5 | 106417 | 321.3 | 1184 | 9.63 | 12.00 | −12.00 |
| 33 | 17001 | 3146.4 | 103493 | 317.8 | 1172 | 9.45 | 12.00 | −12.00 |
| 34 | 17315 | 3178.9 | 100599 | 314.6 | 1160 | 9.27 | 12.00 | −12.00 |
| 35 | 17627 | 3210.2 | 97723 | 311.5 | 1148 | 9.09 | 11.00 | −11.00 |
| 36 | 17935 | 3240.4 | 94894 | 308.6 | 1138 | 8.92 | 11.00 | −11.00 |
| 37 | 18241 | 3269.4 | 92080 | 305.9 | 1128 | 8.74 | 11.00 | −11.00 |
| 38 | 18545 | 3297.4 | 89290 | 303.3 | 1118 | 8.57 | 11.00 | −11.00 |
| 39 | 18845 | 3324.2 | 86522 | 300.8 | 1109 | 8.39 | 11.00 | −11.00 |
| 40 | 19144 | 3350.0 | 83776 | 298.5 | 1100 | 8.22 | 11.00 | −11.00 |
| 41 | 19440 | 3374.9 | 81050 | 296.3 | 1092 | 8.05 | 11.00 | −11.00 |
| 42 | 19734 | 3398.7 | 78343 | 294.2 | 1085 | 7.88 | 11.00 | −11.00 |
| 43 | 20027 | 3421.6 | 75654 | 292.3 | 1077 | 7.72 | 10.50 | −10.50 |
| 44 | 20317 | 3443.6 | 72983 | 290.4 | 1071 | 7.55 | 10.50 | −10.50 |
| 45 | 20606 | 3464.6 | 70327 | 288.6 | 1064 | 7.38 | 10.50 | −10.50 |
| 46 | 20893 | 3484.8 | 67687 | 287.0 | 1058 | 7.22 | 10.50 | −10.50 |
| 47 | 21178 | 3504.1 | 65062 | 285.4 | 1052 | 7.06 | 10.50 | −10.50 |
| 48 | 21462 | 3522.6 | 62450 | 283.9 | 1046 | 6.89 | 10.50 | −10.50 |

TABLE IV-continued

Parabolic Metering

| Step # | Cum. Time (μsec) | Velocity (Steps/Sec) | Acceleration (Steps/Sec 2) | Step Time (μsec/Step) | # Clock Ticks | Torque Required (in-lbs) | Pos. Avail. (in-lbs) | Neg. Avail. (in-lbs) |
|---|---|---|---|---|---|---|---|---|
| 49 | 21744 | 3540.3 | 59851 | 282.5 | 1041 | 6.73 | 10.50 | −10.50 |
| 50 | 22026 | 3557.1 | 57265 | 281.1 | 1036 | 6.57 | 10.50 | −10.50 |
| 51 | 22305 | 3573.1 | 54690 | 279.9 | 1032 | 6.41 | 10.50 | −10.50 |
| 52 | 22584 | 3588.3 | 52126 | 278.7 | 1027 | 6.25 | 10.50 | −10.50 |
| 53 | 22862 | 3602.8 | 49573 | 277.6 | 1023 | 6.09 | 10.00 | −10.00 |
| 54 | 23138 | 3616.5 | 47029 | 276.5 | 1019 | 5.93 | 10.00 | −10.00 |
| 55 | 23414 | 2629.5 | 44494 | 275.5 | 1016 | 5.77 | 10.00 | −10.00 |
| 56 | 23688 | 3641.7 | 41968 | 274.6 | 1012 | 5.62 | 10.00 | −10.00 |
| 57 | 23962 | 3653.2 | 39449 | 273.7 | 1009 | 5.46 | 10.00 | −10.00 |
| 58 | 24235 | 3664.0 | 36939 | 272.9 | 1006 | 5.30 | 10.00 | −10.00 |
| 59 | 24507 | 3674.0 | 34434 | 272.2 | 1003 | 5.15 | 10.00 | −10.00 |
| 60 | 24779 | 3683.4 | 31937 | 271.5 | 1001 | 4.99 | 10.00 | −10.00 |
| 61 | 25049 | 2692.0 | 29445 | 207.9 | 998 | 4.84 | 10.00 | −10.00 |
| 62 | 25320 | 3700.0 | 26958 | 270.3 | 996 | 4.68 | 10.00 | −10.00 |
| 63 | 25589 | 2707.2 | 24477 | 269.7 | 994 | 4.53 | 10.00 | −10.00 |
| 64 | 25859 | 3713.8 | 21999 | 269.3 | 993 | 4.37 | 10.00 | −10.00 |
| 65 | 26128 | 3719.7 | 19526 | 268.8 | 991 | 4.22 | 10.00 | −10.00 |
| 66 | 26396 | 3725.0 | 17056 | 268.5 | 990 | 4.06 | 10.00 | −10.00 |
| 67 | 26664 | 3729.6 | 14590 | 268.1 | 988 | 3.91 | 10.00 | −10.00 |
| 68 | 26932 | 3733.5 | 12125 | 267.8 | 987 | 3.76 | 10.00 | −10.00 |
| 69 | 27200 | 3736.7 | 9663 | 267.6 | 987 | 3.60 | 10.00 | −10.00 |
| 70 | 27467 | 3739.3 | 7203 | 267.4 | 986 | 3.45 | 10.00 | −10.00 |
| 71 | 27734 | 3741.2 | 4744 | 267.3 | 985 | 3.30 | 10.00 | −10.00 |
| 72 | 28002 | 3742.5 | 2286 | 267.2 | 985 | 3.14 | 10.00 | −10.00 |
| 73 | 28269 | 3743.1 | 0 | 267.2 | 985 | 3.00 | 10.00 | −10.00 |
| 74 | 28536 | 3743.1 | 0 | 267.2 | 985 | 3.00 | 10.00 | −10.00 |
| 75 | 28803 | 3743.1 | 0 | 267.2 | 985 | 3.00 | 10.00 | −10.00 |
| 76 | 29070 | 3743.1 | 0 | 267.2 | 985 | 3.00 | 10.00 | −10.00 |
| 77 | 29337 | 3743.1 | 0 | 267.2 | 985 | 3.00 | 10.00 | −10.00 |
| 78 | 29605 | 3743.1 | 0 | 267.2 | 985 | 3.00 | 10.00 | −10.00 |
| 79 | 29872 | 3743.1 | 0 | 267.2 | 985 | 3.00 | 10.00 | −10.00 |
| 80 | 30139 | 3743.1 | 0 | 267.2 | 985 | 3.00 | 10.00 | −10.00 |
| 81 | 30406 | 3743.1 | 0 | 267.2 | 985 | 3.00 | 10.00 | −10.00 |
| 82 | 30673 | 3743.1 | 0 | 267.2 | 985 | 3.00 | 10.00 | −10.00 |
| 83 | 30940 | 3743.1 | 0 | 267.2 | 985 | 3.00 | 10.00 | −10.00 |
| 84 | 31207 | 3743.1 | 0 | 267.2 | 985 | 3.00 | 10.00 | −10.00 |
| 85 | 31475 | 3743.1 | 0 | 267.2 | 985 | 3.00 | 10.00 | −10.00 |
| 86 | 31742 | 3743.1 | 0 | 267.2 | 985 | 3.00 | 10.00 | −10.00 |
| 87 | 32009 | 3743.1 | 0 | 267.2 | 985 | 3.00 | 10.00 | −10.00 |
| 88 | 32276 | 3743.1 | 0 | 267.2 | 985 | 3.00 | 10.00 | −10.00 |
| 89 | 32543 | 3743.1 | 0 | 267.2 | 985 | 3.00 | 10.00 | −10.00 |
| 90 | 32810 | 3743.1 | 0 | 267.2 | 985 | 3.00 | 10.00 | −10.00 |
| 91 | 33078 | 3743.1 | 0 | 267.2 | 985 | 3.00 | 10.00 | −10.00 |
| 92 | 33345 | 3743.1 | 0 | 267.2 | 985 | 3.00 | 10.00 | −10.00 |
| 93 | 33612 | 3743.1 | 0 | 267.2 | 985 | 3.00 | 10.00 | −10.00 |
| 94 | 33879 | 3743.1 | 0 | 267.2 | 985 | 3.00 | 10.00 | −10.00 |
| 95 | 34146 | 3743.1 | 0 | 267.2 | 985 | 3.00 | 10.00 | −10.00 |
| 96 | 34413 | 3743.1 | 0 | 267.2 | 985 | 3.00 | 10.00 | −10.00 |
| 97 | 34681 | 3743.1 | 0 | 267.2 | 985 | 3.00 | 10.00 | −10.00 |
| 98 | 34948 | 3743.1 | 0 | 267.2 | 985 | 2.99 | 10.00 | −10.00 |
| 99 | 32515 | 3743.1 | −172 | 267.2 | 985 | 2.84 | 10.00 | −10.00 |
| 100 | 35482 | 3742.3 | −5088 | 267.2 | 985 | 2.68 | 10.00 | −10.00 |
| 101 | 35749 | 3741.0 | −7548 | 267.3 | 985 | 2.53 | 10.00 | −10.00 |
| 102 | 36017 | 3739.0 | −10008 | 267.5 | 986 | 2.38 | 10.00 | −10.00 |
| 103 | 36284 | 3736.3 | −12471 | 267.6 | 987 | 2.22 | 10.00 | −10.00 |
| 104 | 36552 | 3728.9 | −14935 | 267.9 | 988 | 2.07 | 10.00 | −10.00 |
| 105 | 36821 | 3728.9 | −17402 | 268.2 | 989 | 1.92 | 10.00 | −10.00 |
| 106 | 37089 | 3724.3 | −19873 | 268.5 | 990 | 1.76 | 10.00 | −10.00 |
| 107 | 37358 | 3718.9 | −22346 | 268.9 | 991 | 1.61 | 10.00 | −10.00 |
| 108 | 37627 | 3712.9 | −24824 | 269.3 | 993 | 1.45 | 10.00 | −10.00 |
| 109 | 37897 | 3706.2 | −27307 | 269.8 | 995 | 1.30 | 10.00 | −10.00 |
| 110 | 38167 | 3698.8 | −29794 | 270.4 | 997 | 1.14 | 10.00 | −10.00 |
| 111 | 38438 | 3690.8 | −32287 | 270.9 | 999 | 0.99 | 10.00 | −10.00 |
| 112 | 38710 | 3682.0 | −34785 | 271.6 | 1001 | 0.83 | 10.00 | −10.00 |
| 113 | 38982 | 3672.5 | −37290 | 272.3 | 1004 | 0.68 | 10.00 | −10.00 |
| 114 | 39255 | 3662.3 | −39802 | 273.0 | 1007 | 0.52 | 10.00 | −10.00 |
| 115 | 39529 | 3651.4 | −42322 | 273.9 | 1010 | 0.36 | 10.00 | −10.00 |
| 116 | 39804 | 3639.8 | −44850 | 274.7 | 1013 | 0.20 | 10.00 | −10.00 |
| 117 | 40080 | 3627.4 | −47386 | 275.7 | 1016 | 0.05 | 10.00 | −10.00 |
| 118 | 40356 | 3614.3 | −49931 | 276.7 | 1020 | −0.11 | 10.00 | −10.00 |
| 119 | 40634 | 3600.5 | −52486 | 277.7 | 1024 | −0.27 | 10.50 | −10.50 |
| 120 | 40913 | 3585.8 | −55052 | 278.9 | 1028 | −0.43 | 10.50 | −10.50 |
| 121 | 41193 | 3570.4 | −57629 | 280.1 | 1032 | −0.59 | 10.50 | −10.50 |
| 122 | 41474 | 3554.2 | −60217 | 281.4 | 1037 | −0.75 | 10.50 | −10.50 |
| 123 | 41757 | 3537.2 | −62818 | 282.7 | 1042 | −0.92 | 10.50 | −10.50 |
| 124 | 42041 | 3519.3 | −65432 | 284.1 | 1047 | −1.08 | 10.50 | −10.50 |
| 125 | 42327 | 3500.6 | −68051 | 285.7 | 1053 | −1.24 | 10.50 | −10.50 |

TABLE IV-continued

Parabolic Metering

| Step # | Cum. Time (μsec) | Velocity (Steps/Sec) | Acceleration (Steps/Sec 2) | Step Time (μsec/Step) | # Clock Ticks | Torque Required (in-lbs) | Pos. Avail. (in-lbs) | Neg. Avail. (in-lbs) |
|---|---|---|---|---|---|---|---|---|
| 126 | 42614 | 3481.1 | −70703 | 287.3 | 1059 | −1.41 | 10.50 | −10.50 |
| 127 | 42903 | 3460.6 | −73362 | 289.0 | 1065 | −1.57 | 10.50 | −10.50 |
| 128 | 43194 | 3439.3 | −76037 | 290.8 | 1072 | −1.74 | 10.50 | −10.50 |
| 129 | 43486 | 3417.1 | −78729 | 292.6 | 1079 | −1.91 | 10.50 | −10.50 |
| 130 | 43781 | 3393.9 | −81440 | 294.6 | 1086 | −2.08 | 11.00 | −11.00 |
| 131 | 44078 | 3369.7 | −84170 | 296.8 | 1094 | −2.25 | 11.00 | −11.00 |
| 132 | 44377 | 3344.5 | −86921 | 299.0 | 1102 | −2.42 | 11.00 | −11.00 |
| 133 | 44678 | 3318.3 | −89693 | 301.4 | 1111 | −2.59 | 11.00 | −11.00 |
| 134 | 44982 | 3291.1 | −92489 | 303.9 | 1120 | −2.77 | 11.00 | −11.00 |
| 135 | 45289 | 3262.7 | −95309 | 306.5 | 1130 | −2.94 | 11.00 | −11.00 |
| 136 | 45598 | 3233.3 | −98154 | 309.3 | 1140 | −3.12 | 11.00 | −11.00 |
| 137 | 45910 | 3202.6 | −101027 | 312.2 | 1151 | −3.30 | 11.00 | −11.00 |
| 138 | 46226 | 3170.7 | −103928 | 315.4 | 1163 | −3.48 | 12.00 | −12.00 |
| 139 | 46544 | 3137.6 | −106860 | 318.7 | 1175 | −3.66 | 12.00 | −12.00 |
| 140 | 46866 | 3103.2 | −109825 | 322.2 | 1188 | −3.85 | 12.00 | −12.00 |
| 141 | 47192 | 3067.4 | −112824 | 326.0 | 1202 | −4.03 | 12.00 | −12.00 |
| 142 | 47522 | 3030.2 | −115860 | 330.0 | 1217 | −4.22 | 12.00 | −12.00 |
| 143 | 47857 | 2991.4 | −118936 | 334.3 | 1232 | −4.41 | 12.50 | −12.50 |
| 144 | 48196 | 2951.1 | −122053 | 338.9 | 1249 | −4.61 | 12.50 | −12.50 |
| 145 | 48539 | 2909.2 | −125216 | 343.7 | 1267 | −4.81 | 12.50 | −12.50 |
| 146 | 48888 | 2865.5 | −128426 | 349.0 | 1286 | −5.01 | 12.50 | −12.50 |
| 147 | 49243 | 2819.9 | −131689 | 354.6 | 1307 | −5.21 | 12.50 | −12.50 |
| 148 | 49604 | 2772.4 | −135007 | 360.7 | 1330 | −5.42 | 13.50 | −13.50 |
| 149 | 49971 | 2722.8 | −138386 | 367.3 | 1354 | −5.63 | 13.50 | −13.50 |
| 150 | 50345 | 2671.0 | −141831 | 374.4 | 1380 | −5.84 | 13.50 | −13.50 |
| 151 | 50727 | 2616.8 | −145346 | 382.1 | 1409 | −6.06 | 13.50 | −13.50 |
| 152 | 51118 | 2560.1 | −148940 | 390.6 | 1440 | −6.29 | 15.00 | −15.00 |
| 153 | 51518 | 2500.5 | −152619 | 399.9 | 1474 | −6.51 | 15.00 | −15.00 |
| 154 | 51928 | 2437.9 | −156393 | 410.2 | 1512 | −6.75 | 15.00 | −15.00 |
| 155 | 52350 | 2372.0 | −160272 | 421.6 | 1554 | −6.99 | 16.50 | −16.50 |
| 156 | 52784 | 2302.3 | −164268 | 434.3 | 1601 | −7.24 | 16.50 | −16.50 |
| 157 | 53233 | 2228.6 | −168396 | 448.7 | 1654 | −7.50 | 16.50 | −16.50 |
| 158 | 53698 | 2150.3 | −172674 | 465.0 | 1714 | −7.76 | 17.50 | −17.50 |
| 159 | 54182 | 2066.8 | −177125 | 483.8 | 1784 | −8.04 | 17.50 | −17.50 |
| 160 | 54688 | 1977.2 | −181779 | 505.8 | 1864 | −8.33 | 19.50 | −19.50 |
| 161 | 55219 | 1880.5 | −186671 | 531.8 | 1960 | −8.64 | 19.50 | −19.50 |
| 162 | 55783 | 1775.4 | −191853 | 563.3 | 2076 | −8.96 | 22.00 | −22.00 |
| 163 | 56385 | 1659.8 | −197396 | 602.5 | 2221 | −9.31 | 22.00 | −22.00 |
| 164 | 57038 | 1530.8 | −203405 | 653.2 | 2408 | −9.68 | 23.50 | −23.50 |
| 165 | 57761 | 1383.9 | −210053 | 722.6 | 2664 | −10.09 | 25.00 | −25.00 |
| 166 | 58587 | 1210.3 | −217655 | 826.2 | 3046 | −10.57 | 25.00 | −25.00 |
| 167 | 59597 | 990.6 | −226942 | 1009.5 | 3721 | −11.15 | 27.00 | −27.00 |
| 168 | 61182 | 630.8 | #DIV/0! | 1585.2 | 5844 | #DIV/0! | 28.00 | −28.00 | minimum 144 step profile for a 4.5 inch advance at 1/32 inch per step. The parabolic profile of Table IV meets that requirement. If all of the additional peak speed cruise steps are deleted, then the profile is 144 steps long. The 168 step profile is for the most common advance length of 5.25 inches in paper metering motors for photographic printers. Twenty six steps were added to the parabolic profile at peak speed to make it 168 step in length for proper comparison with the 168 steps profile generated by the method of the present invention.

In FIG. 5 torque available is represented by curves 70 and 70′ in a manner similar to that of FIG. 2, and torque required or requested is represented by curve 72. It is seen that with the parabolic profile both the acceleration curve 64 and the torque required curve 72 are essentially straight lines. This is expected because differentiating a parabola results in a straight line.

With the parabolic profile illustrated in FIGS. 4 and 5 it is noted that the safety margin between the torque available, i.e. stall torque, and the drive torque required by the system is extremely slim around the 15000 μ sec. point. This could lead to the stepper motor stalling under near worst case conditions. Furthermore, the parabolic profile is much less tolerant of system variations. On the other hand, with the profile according to the present invention illustrated in FIGS. 2 and 3, if the safety margin were set to the same slim safety margin caused by the parabolic profile, then the stepper motor controlled by the profile of the present invention could advance or travel the same distance in much less time. Furthermore, it may be possible to reduce the motor torque requirement thereby making the system design more flexible. Generally, it is preferred to set a reasonable safety margin. The procedure according to the present invention allows that margin and/or factor to be set by the user. This is a fundamental difference between the present invention and prior art approaches such as the parabolic approach.

Furthermore, the parabolic profile wastes the system friction. It is not taken into account when ramping down, as evidenced by the huge safety margin shown in FIGS. 4 and 5 between 30,000 μ sec and 60,000 μ sec. In the profile generated by the present invention, as illustrated in FIG. 3, the safety margin/safety factor is relatively constant as previously described. Accordingly, better use is made of the available torque to slow the system down faster.

The stepper motor ramp generation procedure according to the present invention has the advantage that the stepper motor never will be required to drive more load torque than it is capable of, and no unkown marginal torque conditions will exist. With the ramp generated according to the present invention, the stepper motor will move a specified distance in the fastest time allowed by the user specified usable torque. This is because the motor will always be accelerated and decelerated as fast as possible given this usable torque limitation.

Figure 6:
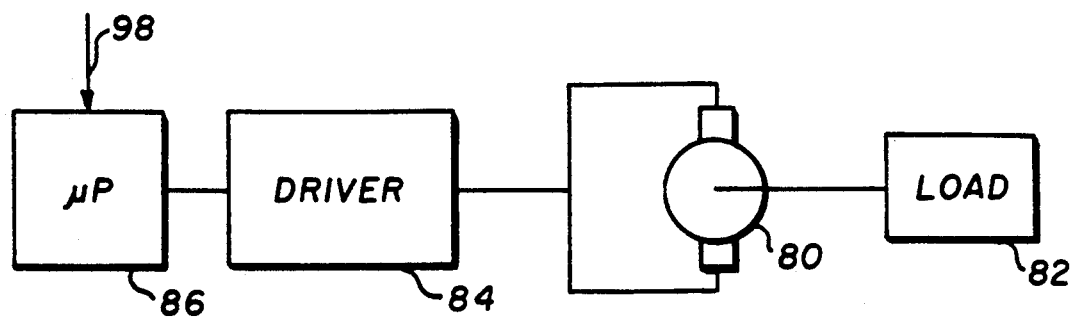
FIG. 6 is a schematic block diagram of a stepper motor system to which the present invention is applicable.
Figure 7:
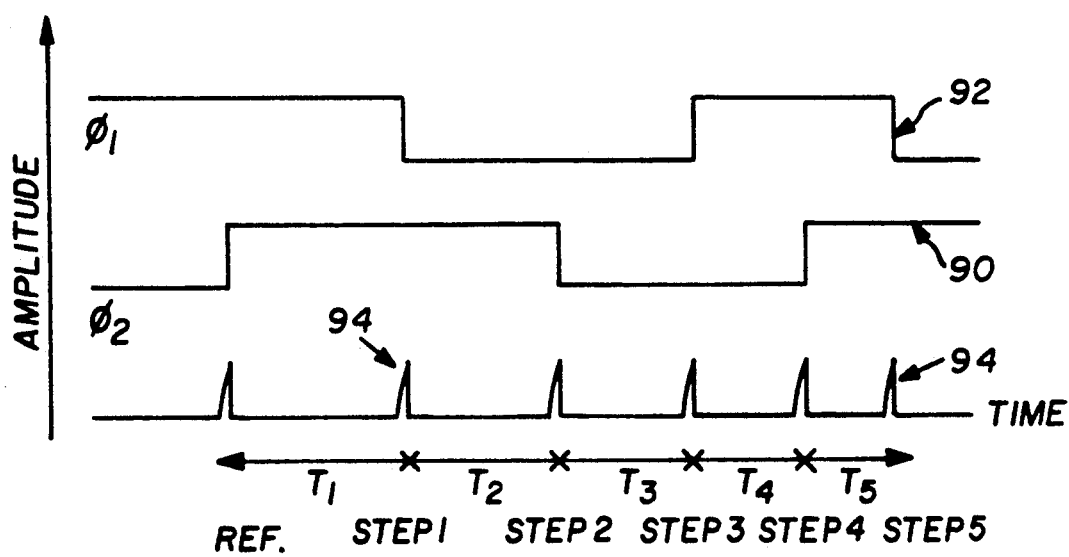
FIG. 7 is a graph including waveforms illustrating the operation of the system of FIG. 6.

Typically, the stepper motor ramp according to the present invention is generated off line and the ramp table generated is input to a microprocessor associated with the stepper motor system. FIG. 6 shows a stepper motor system to which the present invention is applicable including a stepper motor 80 which drives a load 82 and wherein a typical stepper motor driver 84 is provided for motor 80. A microprocessor 86 is connected in controlling relation to motor 80 in a known manner. Waveforms 90 and 92 in FIG. 7 represent two of the voltage phases applied by driver 84 to motor 80 in a manner known to those skilled in the art. These are the electrical pulses supplied to motor 80 for advancing the motor in a known manner. Waveform 94 is the output of microprocessor 86 provided in response to a stepper motor profile, such as the ramp of the present invention, stored therein.

Accordingly, in applying the ramp generated by the method of the present invention to the system of FIG. 6, the count values or clock ticks in column 6 of Table II are input to microprocessor 86 as indicated by arrow 98 in FIG. 6 and are stored there in an appropriate manner, such as in a look up table. Then when the table is called up, the stored counts cause generation of a waveform like that designated 94. In particular, the times between the pulses are determined by the values in column 6 of Table II.

Alternatively, the stepper motor ramp function could be generated on-line in microprocessor 86 in which case the various equations, motor information and system information would be stored in the microprocessor along with a program for performing the various calculations.

It is therefore apparent that the present invention accomplishes its intended objects. While an embodiment of the present invention has been described in detail, that is for the purpose of illustration, not limitation.

What is claimed:

1. A method for generating a stepper motor ramp for controlling the times between electrical pulses supplied to the motor for advancing the motor, said method comprising the steps of:
   a) determining the minimum available torque for the motor;
   b) applying to the available torque a safety factor and then a safety margin to obtain the maximum usable torque wherein the safety factor is derived from motor information and the safety margin is derived from information on a system of which the motor is a part;
   c) calculating the maximum acceleration from the friction and moment of inertia of the system of which the motor is a part and the maximum usable motor torque;
   d) calculating the time duration of the next step for advancing the motor;
   e) repeating steps a) through d) to determine all steps in the ramp; and
   f) utilizing the generated stepper motor ramp in advancing the motor by providing a series of electrical pulses of suitable amplitude and pulse width to advance the stepper motor wherein the times between the pulses are controlled by the ramp.

2. A method according to claim 1, wherein said step of calculating the time duration of the next step for advancing the motor is performed by using the maximum acceleration to generate the next step time and hence the next velocity including computing the next velocity from the desired acceleration and the previous velocity.

3. A method for generating a stepper motor ramp for controlling the times between electrical pulses supplied to the motor for advancing the motor, said method comprising the steps of:
   a) determining the minimum available torque using the current motor velocity and the torque-speed characteristic of the motor;
   b) calculating the maximum usable torque using the available torque determined in step a) and applying a safety factor and a safety margin to the available torque, the safety factor being derived from motor information and the safety margin being derived from information on a system of which the motor is a part;
   c) calculating the maximum possible acceleration for the next motor step using the system friction and moment of inertia and the maximum usable torque at the current speed calculated in step b);
   d) calculating the time duration of the next step for advancing the motor;
   e) repeating steps a) through d) to determine all steps in the ramp; and
   f) utilizing the generated motor ramp in advancing the motor by providing a series of electrical pulses of suitable amplitude and pulse width to advance the stepper motor wherein the times between the pulses are controlled by the ramp.

4. A method according to claim 3, wherein said step of calculating the time duration of the next step for advancing the motor is performed by using the maximum acceleration to generate the next step time and hence the next velocity including computing the next velocity from the desired acceleration and the previous velocity.

5. A method for generating a stepper motor ramp for controlling the times between electrical pulses supplied to the motor for advancing the motor, said method comprising the steps of:
   a) determining the minimum available torque using the current motor velocity and the torque-speed characteristic of the motor;
   b) calculating the maximum usable torque using the minimum available torque determined in step a) and applying a safety factor and then a safety margin to the available torque according to the relationship: Tusable=Tavailable (Safety Factor)−Safety Margin where 0<Safety Factor<2 and Safety Margin<T available (Safety Factor) and where the safety factor is derived from motor information and the safety margin is derived from information on a system of which the motor is a part;
   c) calculating the maximum possible system acceleration for the next motor step from the system friction, system moment of inertia and the maximum usable motor torque at the current speed according to the relationship: $A_n = (Tusable - fr)/m$ where $A_n$ is the maximum possible system acceleration, Tusable is the maximum usable motor torque, f is the system friction, r is the radius of the moment are of the system load and m is the system moment of inertia, and where the maximum system friction expected is used for up ramps and the minimum system friction expected is used for down ramps;

d) calculating the time duration of the next step for advancing the motor using the relationship:

$$A_n = \Delta V/t_n$$

$$\Delta V = Vn - Vn-1$$

$$tn = 1/Vn$$

$$A_n = (Vn - Vn-1)/(1/Vn)$$

$$Vn = \frac{Vn-1 + \sqrt{Vn-1^2 + 4An}}{2}$$

where n is the current step number being calculated, V is motor velocity and tn is the time per step;

e) repeating steps a) through d) to determine all the steps in the ramp; and f) utilizing the generated stepper motor ramp in advancing the motor by providing a series of electrical pulses of suitable amplitude and pulse width to advance the stepper motor wherein the times between the pulses are controlled by the ramp.

6. A method for controlling a stepper motor comprising:
 a) supplying to the stepper motor a series of electrical pulses of suitable available and pulse width to advance the stepper motor; and
 b) controlling the times between said pulses according to a ramp generated by using the minimum available torque at the current speed to ultimately compute the maximum acceleration that can be used, by using the maximum acceleration to generate the next step time and hence the next velocity including computing the next velocity from the desired acceleration and the previous velocity and by taking advantage of system friction during deceleration.

7. In a stepper motor system including a stepper motor for driving a load and a microprocessor-driver combination associated with said stepper motor for supplying a series of electrical pulses of suitable amplitude and pulse width to advance the stepper motor:
 a stepper motor ramp function stored in said microprocessor for controlling the times between said pulses, said ramp maintaining a relatively constant margin between available torque and required torque of said stepper motor during both acceleration and deceleration of said motor while utilizing the full drive capability of said motor during each step of the operation thereof, said ramp including an externally specified safety factor based on stepper motor information and safety margin based on system information.

* * * * *